(12) United States Patent
Kaihotsu

(10) Patent No.: US 7,449,666 B2
(45) Date of Patent: Nov. 11, 2008

(54) COLOR IMAGE SENSOR UNIT AND IMAGE READING APPARATUS USING THE SENSOR UNIT AND CONTROL METHOD THEREFOR

(75) Inventor: Takahiro Kaihotsu, Fujisawa (JP)

(73) Assignee: Canon Components, Inc., Saitama (JP)

( * ) Notice: Subject to any disclaimer, the term of this patent is extended or adjusted under 35 U.S.C. 154(b) by 207 days.

(21) Appl. No.: 10/598,862

(22) PCT Filed: Mar. 16, 2005

(86) PCT No.: PCT/JP2005/004646

§ 371 (c)(1),
(2), (4) Date: Sep. 13, 2006

(87) PCT Pub. No.: WO2005/088955

PCT Pub. Date: Sep. 22, 2005

(65) Prior Publication Data

US 2007/0145233 A1     Jun. 28, 2007

(30) Foreign Application Priority Data

Mar. 16, 2004   (JP)   .............................. 2004-073657

(51) Int. Cl.
 H04N 1/028   (2006.01)
 G01J 1/32    (2006.01)
 H01L 27/00   (2006.01)
(52) U.S. Cl. ................... 250/205; 250/208.1; 250/226; 358/509; 358/512; 358/514

(58) Field of Classification Search ................ 250/205, 250/226, 208.1; 358/505, 509, 512, 513, 358/514
See application file for complete search history.

(56) References Cited

U.S. PATENT DOCUMENTS

| | | | |
|---|---|---|---|
| 5,898,510 A | 4/1999 | Kaihotsu et al. | 358/509 |
| 7,202,461 B2 * | 4/2007 | Muraoka | 250/208.1 |
| 7,378,630 B2 * | 5/2008 | Yoshida | 250/205 |
| 2007/0145233 A1 * | 6/2007 | Kaihotsu | 250/205 |

(Continued)

FOREIGN PATENT DOCUMENTS

JP    4-266261    9/1992

(Continued)

OTHER PUBLICATIONS

International Preliminary Report in counterpart application PCT/JP 2005/004646.

(Continued)

*Primary Examiner*—John R Lee
(74) *Attorney, Agent, or Firm*—Fitzpatrick, Cella, Harper & Scinto

(57) ABSTRACT

A color image sensor which uses a sensor array that has, as a lighting light source, 3-color light emitting elements capable of independently controlling light emitting timings respectively and at least three pixel arrays respectively constituted by a plurality of pixels, respective pixel arrays being comprising color filters having different transmitting wavelength regions from each other, and which independently controls the lighting start and lighting period of each light emitting element, whereby it is possible to prevent color misalignment in an output image signal and regulate the image signal level of each color component.

12 Claims, 16 Drawing Sheets

U.S. PATENT DOCUMENTS

2008/0029687 A1    2/2008   Kaihotsu ................... 250/206

FOREIGN PATENT DOCUMENTS

| JP | 2000-316067 | 11/2000 |
| JP | 3253097 | 11/2001 |
| JP | 2003-46718 | 2/2003 |
| JP | 2003-324377 | 11/2003 |
| WO | WO 2005/088955 A1 | 9/2005 |

OTHER PUBLICATIONS

Korean Notice of Allowance dated Feb. 25, 2008, regarding Application No. 10-2006-7018959.

English translation of PCT International Preliminary Report in counterpart application PCT/JP2005/004646.

* cited by examiner

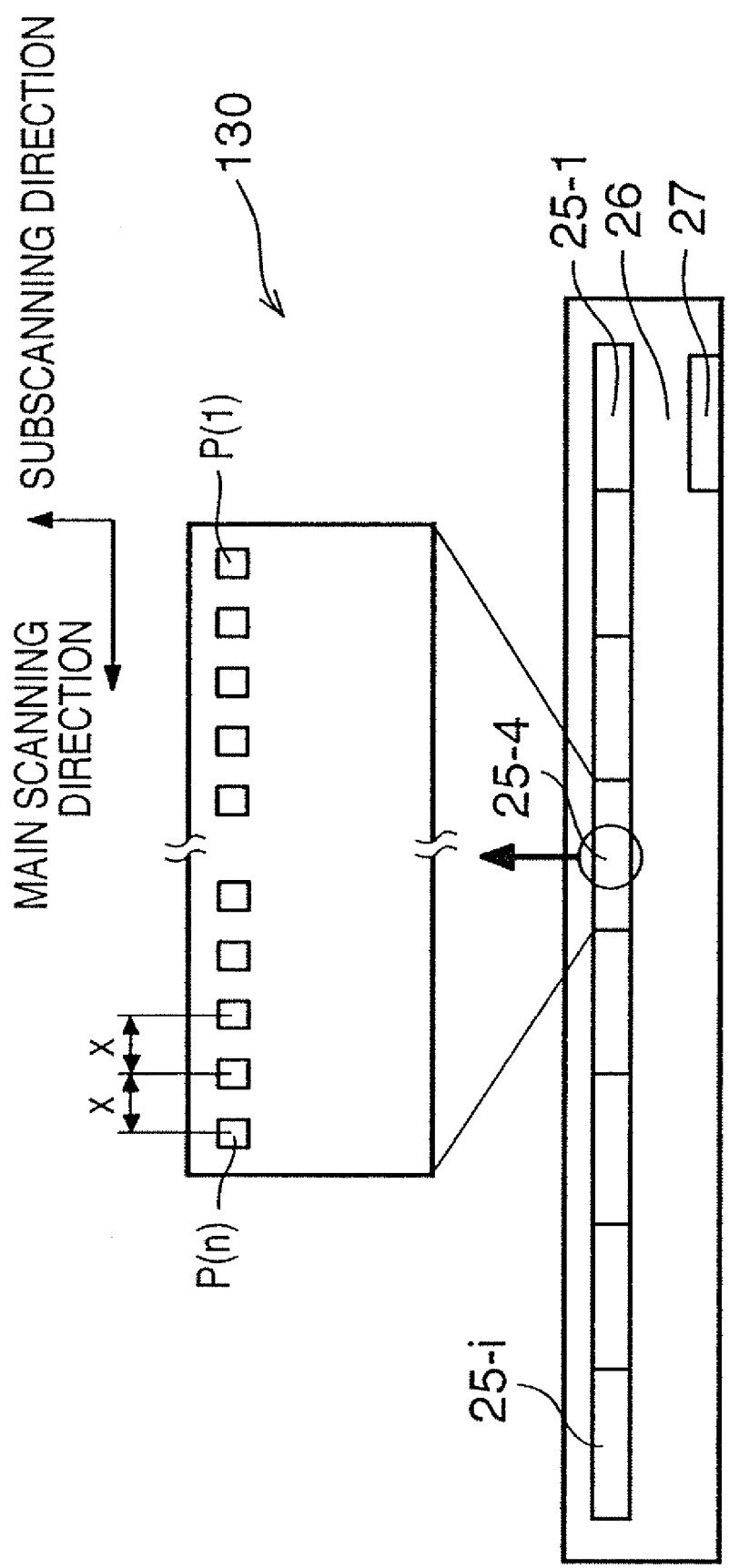

COLOR IMAGE SENSOR UNIT AND IMAGE READING APPARATUS USING THE SENSOR UNIT AND CONTROL METHOD THEREFOR

TECHNICAL FIELD

The present invention relates to a color image sensor unit provided for an image reading section which reads reflected light from the surface of an original, an image reading apparatus using the color image sensor unit, and a method for controlling the image reading apparatus.

BACKGROUND ART

Conventionally, in image reading apparatuses, such as an image scanner and copying machine, a contact image sensor (hereinafter abbreviated as CIS) which is arranged close to an original so as to read it without magnification, has been used as an image sensor which optically reads image information of the original and converts the read information to an electric signal.

FIG. 13A and FIG. 13B depict views for explaining the CIS unit. FIG. 13A depicts a sectional view of the CIS unit, and FIG. 13B depicts a drive circuit of a light source in the CIS unit.

Light emitted from a light source 21 arranged on the end surface of a light guide member 22, is made incident on the light guide member 22, and is guided in the longitudinal direction (perpendicular direction in the figure (main scanning direction)), and linearly irradiates in the main scanning direction of an original 29 placed on an original supporting table 28 such as glass, in a substantially uniform manner. The light source 21 is provided with light emitting elements 21-r, 21-g and 21-b which emit lights having wavelengths of three colors of red, green and blue (hereinafter abbreviated as RGB), respectively. Generally, LEDs of RGB colors are used as these light emitting elements, and the respective light emitting elements are independently driven to be lighted by time-division driving.

In this way, the reflected light from the original 29 illuminated by the light source 21, is converged by a lens array 24, and is formed into an image on a sensor array 25 arranged on a substrate 26. An image signal outputted from the sensor array 25 is outputted to the outside via a connector 27. The light guide member 22, lens array 24, substrate 26 and the like are fixed to predetermined positions by a frame 23.

In FIG. 13B, an FET for driving is connected to each of the light emitting elements 21-r, 21-g and 21-b. Each FET is turned on by making drive signals φLR, φLG and φLB reach a high level, respectively. Thereby, the on-state FET allows current to flow through the light emitting element corresponding to the FET, so that the light emitting element is driven to emit light.

FIG. 14 depicts an external view of the sensor array 25 in the longitudinal direction (main scanning direction), and portions which are common to those in FIG. 13A and FIG. 13B are denoted by the same reference numerals. Note that reference numeral 130 denotes a sensor IC portion constituting the sensor array 25 on an enlarged scale.

Here, the sensor array 25 is not provided with a function to identify color, but merely performs photoelectrical conversion of the incident light quantity. Therefore, here, image signals of an original of respective color components are detected by synchronizing the timing of respective drive signals φLR, φLG, φLB of the RGB light sources and the outputs of sensor array 25 with each other.

The CIS reads an original without magnification, and hence, needs to have a sensor with a length corresponding to the width of the original. To accomplish this, the CIS has a multi-chip constitution in which plural sensor ICs (25-l) to (25-i) are linearly arranged. Here, in each of the sensor ICs, n pixels P(1) to P (n) which perform photoelectric conversion are linearly arranged in the main scanning direction at a predetermined interval x, respectively. For example, in the case of a sensor IC whose resolution is set to 600 dpi, the interval x is set as x=42 µm.

Further, with the increase in the image read speed in recent years, it is required to increase the operating speed of the sensor. In order to cope with this requirement, the operating speed of the sensor array 25 is increased by parallelly taking out the outputs of respective sensor ICs of the sensor array 25 having the multi-chip constitution.

FIG. 15 is a figure explaining an operation timing of the above described CIS.

The above described drive signals φLR, φLG, φLB are successively outputted in synchronous with an external synchronizing signal SP. In this way, a reading operation of RGB color images of one line is completed during a time period of 3 times the SP cycle. Further, the sensor IC 25 is constituted so as to collectively transfer electric charges stored by the respective pixels during the SP period to an analog memory (not shown) provided in the sensor IC 25, and to successively output the transferred electric charges (denoted as OS (R), OS (G) and OS (B)) from the analog memory in succeeding SP cycles.

Hence, since the CIS is a line sensor, it is necessary to move the CIS unit in the subscanning direction relative to the original, in order to acquire two-dimensional information of the original. At this time, for example, when the original is read by the resolution of 600 dpi, assuming that the SP cycle which is a sensor operation cycle period for one color is set to TW (second), the relative moving speed V between the original and the CIS unit is set as V=42 [µm]/3×TW [sec]. While the original is read, the original and the CIS unit are moved relative to each other at the constant speed V. At this time, the irradiation positions on the original in the subscanning direction are different for each of RGB. This causes the RGB read timing to be different for each of RGB. For this reason, when RGB outputs are composed as they are and formed as color image information, the color misalignment is caused in the subscanning direction.

FIG. 16A depicts a view for explaining the color misalignment in the subscanning direction. White squares 1501 to 1503 in FIG. 16A represent reading positions on the original read by a certain pixel at respective points of time T1 to T4 in FIG. 15 shown as a timing chart. For example, the R component information of the original is obtained as reflected light of the light emitted from the light emitting element 21-r which is turned on at the timing of φLR during the period TW. However, the original and the CIS unit are moved relative to each other in the subscanning direction at the speed V, as described above. Thus, when the G component information of the original is read at the subsequent time point T2, the reading position on the original is moved from the position at the time point T1 to the position at the time point T2 in the figure. Each of parallelograms 1504 to 1506 in the figure represents reading areas for respective RGB on the original, when the movement in the subscanning direction is taken into account. Therefore, when the deviation amount of the whole RGB is set to Δy, the reading areas of respective RGB are sequentially deviated by ⅓Δy.

On the other hand, there is proposed a CIS adopting a color decomposition system in which three pixel arrays are provided on the sensor IC used for the CIS, and color filters for RGB are mounted on the respective pixel arrays (Patent document 1).

FIG. 17 depicts an external view of such sensor array in the main scanning direction, and reference numeral 160 denotes an enlarged view of the sensor IC part.

This sensor array is constituted similarly to that shown in FIG. 14 as described above, in that plural sensor ICs which perform photoelectric conversion are linearly arranged in order to realize a long read width. Further, in the respective sensor ICs 35-*l* to 35-*i*, as denoted by reference numeral 160 in the figure, pixels which perform photoelectric conversion are arranged at an interval x in the main scanning direction, and three arrays of the pixels are arranged at an interval y in the direction of relative movement between the original and the sensor IC (subscanning direction). Further, three kinds of color filters CF-r, CF-g and CF-b which have transmission wavelength regions corresponding to RGB are arranged on the respective pixel arrays on each sensor IC. This enables the pixels of each pixel array to have the spectral sensitivity corresponding to each color of RBG. This sensor array has a multi-chip constitution in which outputs of the three pixel arrays are arranged to be taken out from one common output line, so as to allow the outputs of respective sensor ICs constituting the sensor array to be parallelly taken out for the purpose of raising the operating speed.

FIG. 18 is a timing chart showing the operation of the color CIS unit shown in FIG. 17.

Unlike in the above described case of FIG. 15, the decomposition of an image signal to each color component is performed by the color filter, and hence, a single white-color Xe tube or LED and the like which has a wide emission spectrum in a visible wavelength region is used as the light source. Thus, one kind of drive signal for controlling lighting of the light source is required, and the light source is kept turned on during the reading operation of the CIS unit. Therefore, in the CIS unit using the sensor IC having the three line constitution provided with such color filters, RGB information for one line of an image can be read during one operation cycle (within the period TW), as shown in FIG. 18.

Even in this case, the two-dimensional image is read, while the original and the CIS unit are moved relative to each other in the subscanning direction. Here, the interval y between the pixel arrays on the sensor IC in the subscanning direction is arranged to be, for example, an integer multiple of the line interval at the resolution of 600 dpi. In such a case, the deviation of reading positions on the original with respect to the line signals of RGB becomes the interval y. Thus, when color information is generated by composing the RGB signals, the positional deviation of each line data is corrected by delaying each line data by the amount corresponding to the interval between the pixel arrays, so that an image without color misalignment is obtained.

FIG. 19A depicts a view for illustrating the deviation of reading positions on the original. In the figure, respective squares represent the reading positions of a pixel line on the original at each of the time points T1 and T2 in FIG. 18 as the timing chart. Further, respective parallelograms 180 to 182 corresponding to each of RGB represent the reading areas on the original for which the relative movement between the original and the CIS unit is taken into account. For example, when the original is read at a resolution of 600 dpi, assuming that the period of SP which is the operating cycle period of the sensor is set to TW (second), the relative movement speed V between the original and the CIS unit is set as V=42 [μm]/TW. Here, when the interval y between the pixel arrays shown in FIG. 17 is set to 42 [μm] which is equal to the interval between the pixel lines, the reading positions for the respective pixel arrays which are separated for each color are also deviated by 42 [μm]. This makes it possible to eliminate the generation of color misalignment by composing image signals of respective colors in consideration of, for example, the delay time (for one line) of one line signal (181) of G with respect to one line signal (180) of R, and the delay time (for two lines) of one line signal (182) of B with respect to one line signal (180) of R.

Patent document 1: Japanese Patent Laid-Open No. 2003-324377

However, when the sensor array shown in FIG. 17 is used, following problems arise. When there are differences in the spectral sensitivity between the sensors and in the RGB ratio of emission spectrum between the light sources, the level differences between respective RGB signals occur, as shown in FIG. 18. Here, when white balance is to be adjusted, it is necessary to amplify color component signals with a low level. Generally, the sensor IC has a low spectral sensitivity in the B component, while the light source has a large emitted light quantity in the R component. As a result, the B component signal level tends to become lower than the R component signal level. For this reason, there is a need to amplify the B component signal. Thus, there is a problem that the noise component contained in the B component signal is also amplified by such signal amplification, and thereby the S/N ratio of the B component signal is lowered as compared with the R component signal. For this reason, the color temperature of the light source needs to be adjusted so as to correspond to the spectral sensitivities of the sensor ICs which constitute the above described CIS unit.

Further, in the above described prior art form, when the CIS unit is used as a reading apparatus of an original, the reading resolution in the subscanning direction may be changed for the purpose of reducing the reading time and of the resolution conversion, or the like. On the other hand, when the reading speed in the subscanning direction is changed, that is, when the reading operation is performed in the state where the resolution in the subscanning direction is different from the resolution in the main scanning direction, the color misalignment occurs in the read image. For example, a case is considered where the reading operation is performed at a resolution of 300 dpi in the subscanning direction by using a CIS unit having pixel arrays of a resolution 600 dpi, as shown in FIG. 17. FIG. 19B is a schematic illustration showing reading positions on the original moved when the reading speed in the subscanning direction is doubled. In the figure, white squares represent the respective reading positions on the original for each of RGB in the points of time T1 and T2 in FIG. 18. Further, parallelograms 183 to 185 represent the reading areas on the original, for which the relative movement between the original and the CIS unit is taken into account. When the resolution in the subscanning direction is reduced by half, and the reading operation is performed at the resolution of 300 dpi, assuming that the SP period which is one operating cycle period is set to TW (second), the speed V' of relative movement in the subscanning direction between the original and the CIS unit is set as V'=2V=84 [μm]/TW. As described above, when the interval y between the pixel arrays is equal to 42 [μm] which is equal to the interval between the pixel lines of 600 dpi, the deviation between adjacent reading positions for the respective pixel arrays which are decomposed for each color becomes 42 [μm], and hence the distance corresponding to one line delay becomes 84 [μm]. Then, for example, when the line signal (185) of B is delayed by one line, the line signal (185) of B is made coincident with the line signal (183) of R. However, the deviation amount of the line signal (184) of G becomes 0.5 line, for which deviation amount cannot be corrected by the delay processing in the unit of one line.

Also, in the case of FIG. 14, when the resolution in the subscanning direction is reduced, the color misalignment is further increased. FIG. 16B depicts a view illustrating the reading positions when the resolution in the subscanning direction is set to ½ of the resolution in FIG. 16A. Also in this case, the difference between the one line signal (1507) of R and the one line signal (1508) of B does not become an integral multiple of one line. This makes it difficult to perform superimposition of RGB signals by the delay processing in the unit of one line. From this, it is seen that the color misalignment cannot be corrected.

An object of the present invention is to solve the above described problems of the prior art.

A feature of the present invention is to provide a color image sensor which comprises light emitting elements that emit light of respective color components, and an array of sensors that detect image signals of the respective color components, and which is capable of adjusting output signal levels from the respective sensors. A feature of the present invention is also to provide an image reading apparatus using the unit of the sensors and a method for controlling the image reading apparatus.

Further, a feature of the present invention is to provide an image reading apparatus which is capable of preventing color misalignment of image signals obtained by reading an original, even when reading speed in the subscanning direction is changed, and to provide a method for controlling the image reading apparatus.

DISCLOSURE OF INVENTION

The above described features are attained by the combination of the features described in the independent claims, and the subclaims merely specify the advantageous examples according to the present invention.

According to one aspect of the present invention, there is provided a color image sensor unit comprising: a light source for lighting; an image forming means for forming an image of reflected light which is irradiated by the light source and reflected from a member to be read; and a sensor array for converting the image formed by the image forming means into an electric signal,
  wherein the sensor array has at least three pixel arrays each of which has plural pixels, and has color filters each of which has a different transmission wavelength region from each other and is arranged for each of pixel arrays, and
  wherein the light source has at least three light emitting elements, each of which emits light having a different wavelength from each other, and each of the light emitting elements is able to be independently driven.

According to one aspect of the present invention, there is provided an image reading apparatus comprising:
  a color image sensor unit comprising a light source that has at least three light emitting elements each of which emits light having a different wavelength from each other, an image forming lens that forms an image of reflected light which is irradiated by the light source and reflected by an original, and a sensor array that has at least three pixel arrays each of which has plural pixels, and color filters each of which has a different transmission wavelength region for each of the pixel arrays, and that converts the image formed by the image forming lens into an electric signal;
  moving means for moving the original and the color image sensor unit relative to each other in the direction substantially perpendicular to the pixel array;
  driving means for independently driving the respective light emitting elements of the light source; and
  output means for generating an image signal corresponding to the original on the basis of image signals corresponding to respective colors, which image signals are outputted from the color image sensor unit in synchronous with a light emission driven by the driving means, and for outputting the generated image signal.

According to one aspect of the present invention, there is provided a control method of an image reading apparatus comprising a color image sensor unit having:
  a light source that has at least three light emitting elements each of which emits light having a different wavelength from each other, an image forming lens that forms an image of reflected light which is irradiated by the light source and reflected by an original, and a sensor array that has at least three pixel arrays each of which has plural pixels, and color filters each of which has a different transmission wavelength region for each of the pixel arrays, and that converts the image formed by the image forming lens into an electric signal, the control method comprising:
  a moving step of moving an original and the color image sensor unit relative to each other in the direction substantially perpendicular to the pixel arrays;
  a driving step of independently driving the respective light emitting elements of the light source to enable the original to be irradiated moved in the moving step; and
  an outputting step of generating an image signal corresponding to the original on the basis of image signals corresponding to respective colors, which image signals are outputted from the color image sensor unit in synchronous with the light emission driven in the driving step, and of outputting the generated image signal.

Note that all the required features are not listed in the inventive concept as expressed herein, and hence, subcombinations of these feature groups are also included in the scope of the present invention.

According to the present invention, light emitting elements for emitting light of respective color components, and arrays of sensors for detecting image signals of the respective color components are provided, so as to make it possible to adjust the level of output signals from the respective sensors.

Further, according to the present invention, even when the reading speed in the subscanning direction is changed, it is possible to obtain an effect of preventing color misalignment of an image signal read from an original.

Further features of the present invention will be apparent from the following description of exemplary embodiments with reference to the attached drawings.

BRIEF DESCRIPTION OF DRAWINGS

Accompanying drawings incorporated herein and constituting a part of the present application illustrate embodiments not only for the description of embodiments of the present application but also for explaining the principle of the present invention.

FIG. 14 depicts an external view of a conventional sensor array in the longitudinal direction (main scanning direction);

BEST MODE FOR CARRYING OUT THE INVENTION

In the following, preferred embodiments according to the present invention will be described in detail with reference to the accompanying drawings. Noted that the following embodiments are not restrictive as to the scope of the present invention as recited in the claims, and all combinations of the features described in the embodiments are not always essential for the solution according to the present invention.

Embodiment 1

Figure 1:
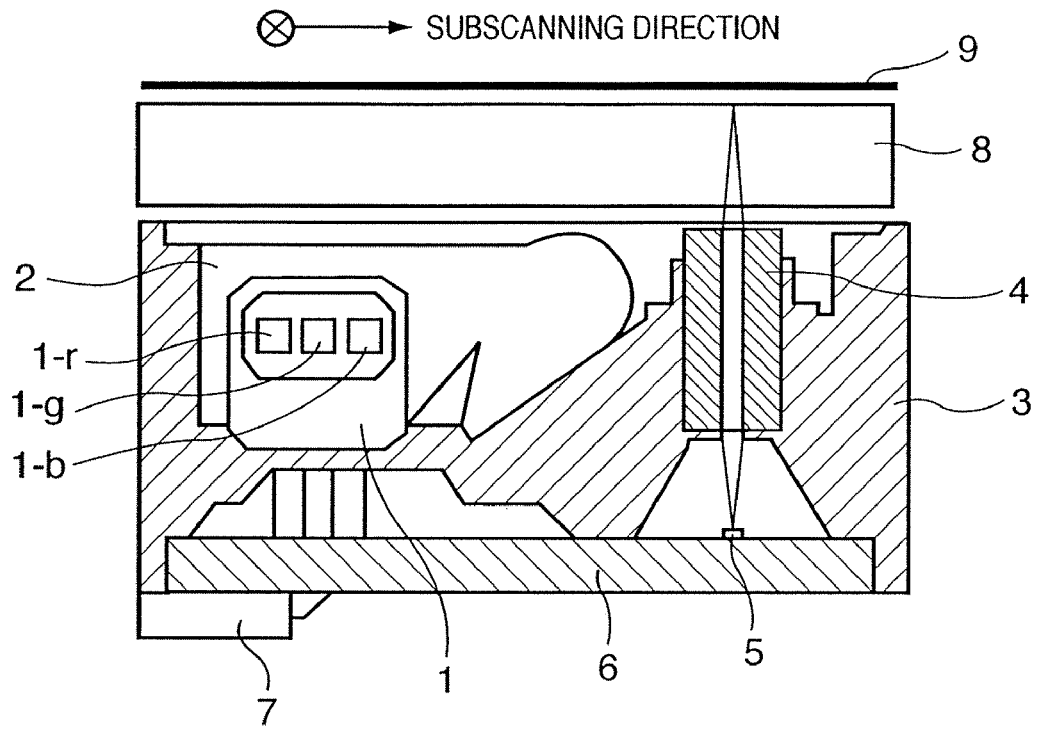
FIG. 1 is a block diagram showing a constitution of a color contact image sensor (CIS) unit according to an embodiment of the present invention.

FIG. 1 is a block diagram showing a constitution of a color contact image sensor (CIS) unit according to an embodiment of the present invention. Note that the CIS unit according to the present embodiment comprises at least a light source 1, a light guide member 2 for illuminating in the width direction of an original with light from the light source 1, and a sensor array 5 for detecting reflected light from the original.

In FIG. 1, the light source 1 is a light source for illuminating the original 9, and light emitting elements 1-r, 1-g and 1-b for respectively emitting light having wavelengths of primary three colors (RGB) are mounted to the light source 1. The light emitted from the light source 1 is introduced into the inside of the light guide member 2 arranged in the width direction of the original, and guided in the perpendicular direction (main scanning direction) in FIG. 1, so as to irradiate as linear light flux from a light emitting section provided for the light guide member 2. This enables the original 9 placed on an original supporting member 8 to be substantially uniformly illuminated in the main scanning and width direction of the original 9. The light which is irradiated from the light source 1 and reflected by the original 9 is converged on the sensor array 5 mounted on a substrate 6, by a lens array 4. The sensor array 5 generates an electric signal corresponding to an image formed by the lens array 4. This electric signal is outputted to an external unit via a connector 7. A frame 3 is a frame for holding the above described light guide member 2, lens array 4, substrate 6 and the like at predetermined positions.

Figure 2:
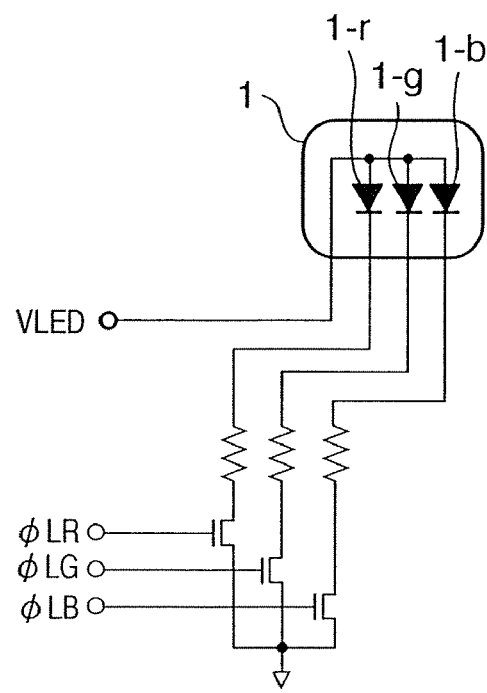
FIG. 2 depicts a view for illustrating a drive circuit of a light source according to the embodiment of the present invention.

FIG. 2 depicts a drive circuit of the light source 1. The drive circuit may be provided in the CIS sensor unit, or may also be provided outside the CIS sensor unit.

LEDs whose anodes are connected in common and which emit respective RGB light beams are used as the light emitting elements 1-r, 1-g and 1-b, respectively. An FET is connected, as a switch, to the cathode of each of the LEDs. This makes it possible to individually control the lighting of the respective LEDs by drive signals φLR, φLG and φLB.

Figure 3:
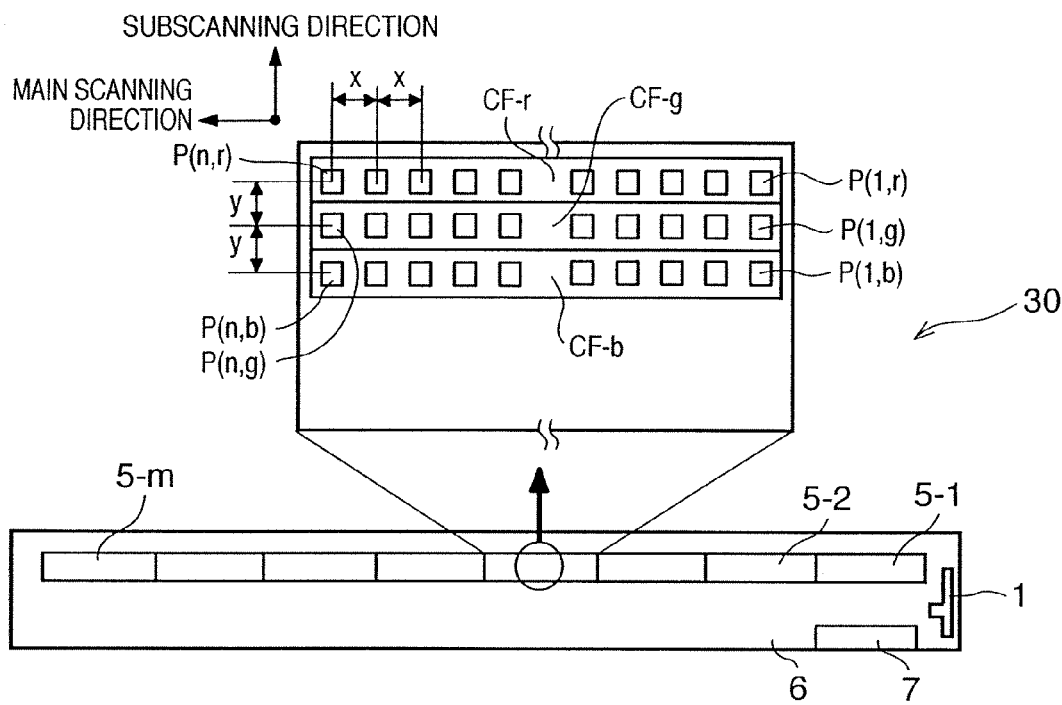
FIG. 3 depicts an external view of a sensor array 5 according to the embodiment of the present invention.

FIG. 3 depicts an external view showing the sensor array 5 according to the present embodiment. Reference numeral 30 denotes, on an enlarged scale, arrays of sensors (pixels) of one sensor IC which constitutes the sensor array.

The sensor array 5 is constituted by linearly arranging plural (m pieces of) sensor ICs (5-1, 5-2, ..., 5-m), each of which performs photoelectric conversion, in the main scanning direction. In each of the sensor ICs, as shown by reference numeral 30, n openings (pixels) P, each of which is provided with a photodiode performing photoelectric conversion, are arranged at an interval x in the main scanning direction. Hereinafter, this set of openings (pixels) is referred to as a pixel array.

Three pixel arrays are arranged at an interval y in the subscanning direction. Here, the interval x between each of the pixels determines the optical resolution of the sensor array 5. For example, in the case of the sensor array 5 of 600 dpi, the interval x is set to 42 [μm]. Further, the interval y between the pixel arrays is set to an integral multiple of the pixel interval x so as to enable the correction for color misalignment to be performed by the above described inter-line delay. In this case, it is preferred to make x and y equal to each other in order to minimize the area and the inter-line delay memory capacity of the sensor IC. On the respective pixel arrays, three kinds of color filters CF-r, CF-g and CF-b, each of which has different spectral transmittance, are mounted, so as to enable each of the pixel arrays to have the spectral sensitivity corresponding to each color of RGB.

Figure 4:
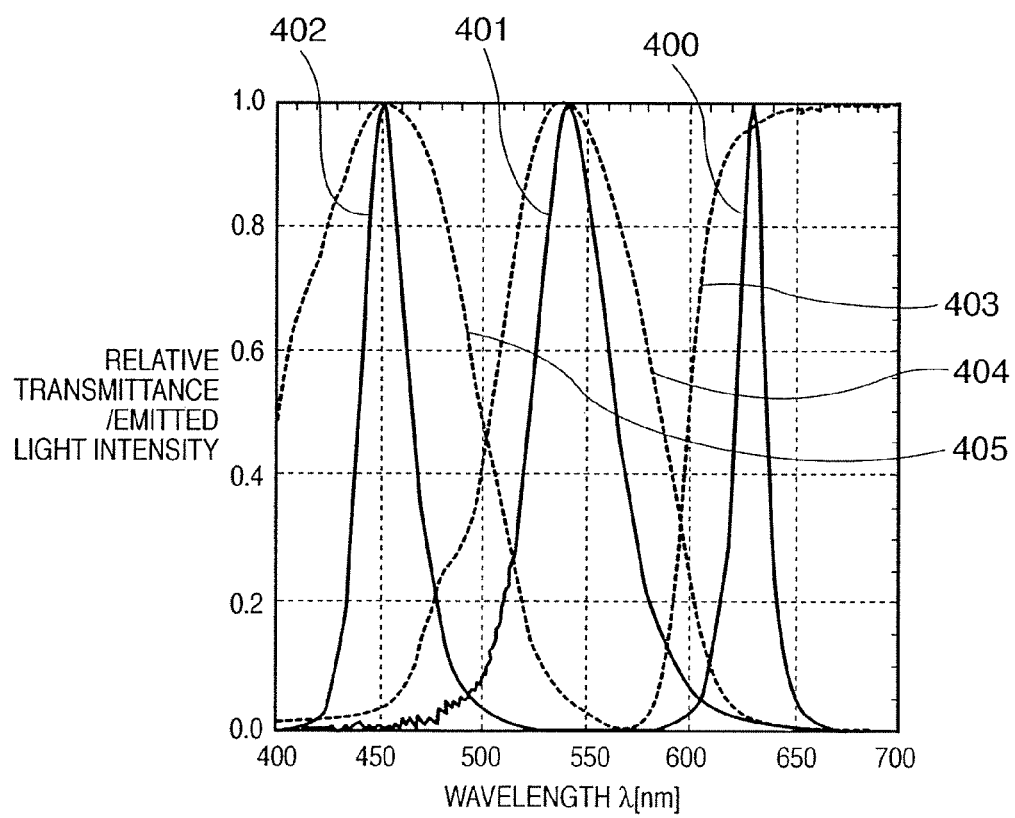
FIG. 4 is a figure showing each emission spectrum of light emitting elements 1-r, 1-g and 1-b, and each spectral transmittance of color filters CF-r, CF-g and CF-b, according to the embodiment of the present invention.

FIG. 4 is a figure showing the emission spectra of light emitting elements 1-r, 1-g and 1-b, which constitute the light source 1 according to the present embodiment, and the spectral transmittance of color filters CF-r, CF-g and CF-b, which are provided for the respective pixel arrays of sensor ICs constituting the sensor array 5.

In the figure, reference numeral 400 denotes the emission spectrum of the light emitting element 1-r, 401 denotes the emission spectrum of the light emitting element 1-g, and 402 denotes the emission spectrum of the light emitting element 1-b. Further, reference numeral 403 denotes the spectral transmittance of the filter CF-r, 404 denotes the spectral transmittance of the filter CF-g, and 405 denotes the spectral transmittance of the filter CF-b.

Here, in order to improve the color decomposition performance, the spectral transmittance is set so as to reduce the overlapping portions of the transmission wavelength regions of the three kinds of color filters CF-r, CF-g and CF-b. Similarly, wavelengths of lights emitted the three light emitting elements 1-r, 1-g and 1-b, are also set so as to reduce the overlapping portions of the emission spectra.

Here, it is preferred that there are the following relationships between the transmission wavelength regions of the color filters CF-r, CF-g and CF-b and the wavelengths of lights emitted from the light emitting elements 1-r, 1-g and 1-b. That is, each emission spectrum of the three light emitting elements is set to have a half-value width smaller than the transmission wavelength region of the color filter having the color corresponding to the emission spectrum, so as to make the emission spectrum included in this transmission wavelength region, and is also set to minimize the overlapping portions with the transmission wavelength regions of other two filters. In practice, since pigments and dyes are actually used for the color filters arranged on each pixel of the sensor array, the half-value width of the spectral spectrum of color filter is about 100 nm. Further, as the light emitting element, an LED with a steep rising characteristic of light emitting is preferred, and the half-value width of each emission spectrum of RGB is set to 50 nm or less.

Further, since the rising characteristic of each emission spectrum of the light emitting elements is steep, the rate at which light of the tail part of the emission spectrum of a light emitting element is transmitted through the color filters of other colors which are adjacent to the light emitting element to be detected, is suppressed to be very low. Therefore, the color information of light from a light emitting element of a certain color is detected only by the pixel array of the sensor IC, which has the color filter of the same color as the light emitting element, and is hardly detected by the other two pixel arrays which have the color filters of other colors. For this reason, even when the three light emitting elements are simultaneously driven to be lighted, the color information of each of the light emitting elements is independently detected only by the pixel array which has the color filter of the color corresponding to the wavelength of the light emitted from the corresponding light emitting element. Thereby, it is possible to significantly reduce the level (noise) of the information of other colors contained in certain color information.

Figure 5:
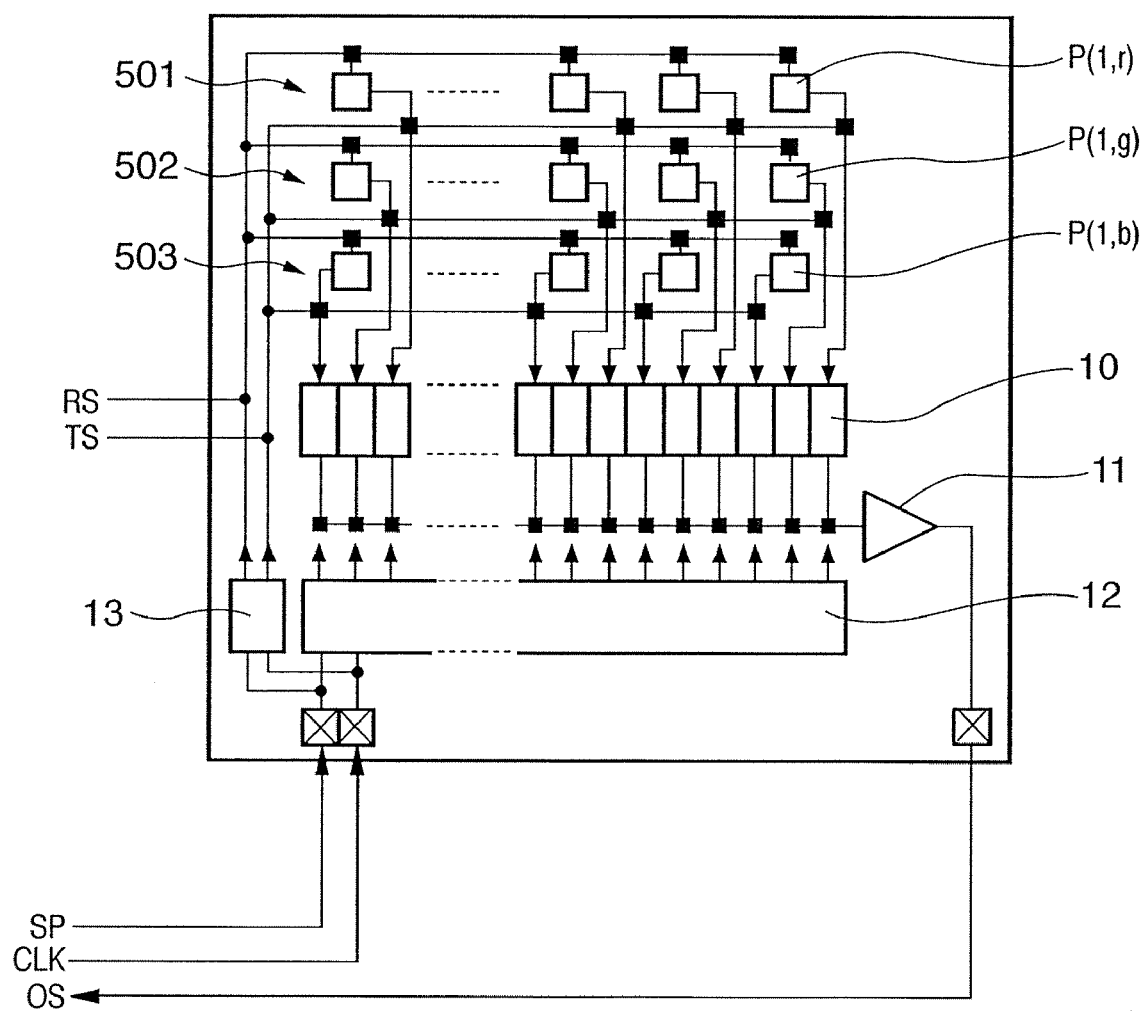
FIG. 5 is an equivalent circuit diagram of a sensor IC which constitutes the color CIS unit according to the present embodiment.
Figure 6:
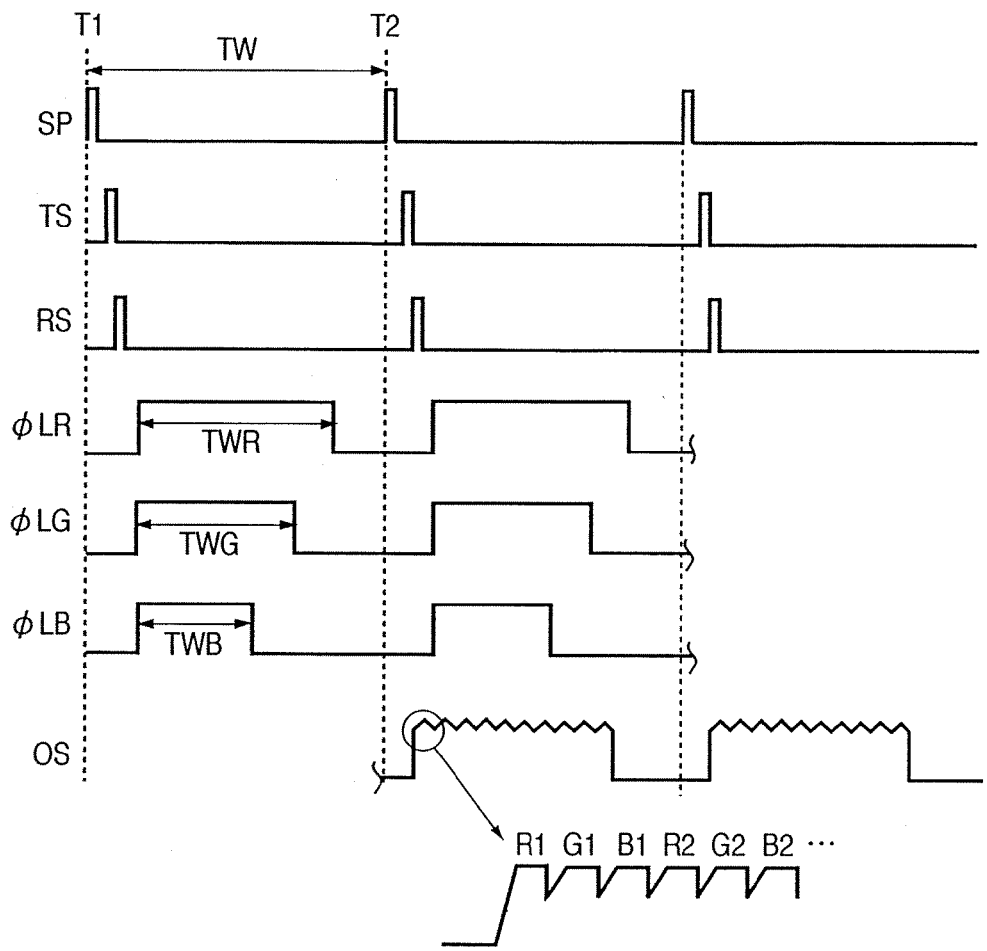
FIG. 6 is a timing chart explaining an operation timing of a light source drive circuit of the color CIS unit according to the present embodiment.

FIG. 5 is an equivalent circuit diagram of the sensor IC constituting the color CIS unit according to the present embodiment. Further, FIG. 6 is a timing chart explaining the operation timing of the light source drive circuit of the color CIS unit according to the present embodiment. In FIG. 5, reference numeral 501 denotes an R pixel array which generates a pixel signal of R from light transmitted through the color filter CF-r, reference numeral 502 denotes a G pixel array which generates a pixel signal of G from light transmitted through the color filter CF-g, and reference numeral 503 denotes a B pixel array which generates a pixel signal of B from light transmitted through the color filter CF-b.

Reference character SP in FIG. 6 denotes a synchronizing signal of an image inputted from an external unit and controls the operation cycle of the sensor IC. That is, the period TW of SP signal corresponds to the reading period for one line.

In FIG. 5, when the synchronizing signal SP is inputted, a timing generation circuit 13 generates a transfer signal TS and a reset signal RS in synchronous with the synchronizing signal SP. Further, drive signals φLR, φLG and φLB in FIG. 6 denote drive signals for each of three light emitting elements 1-r, 1-g and 1-b.

The respective pixel signals formed by each sensor IC are formed by photodiodes with openings P(1) to P(n), reset circuits, and transfer circuits. Each photodiode is reset to an initial state by the reset circuit driven by the reset signal RS, and thereafter, accumulates photocarriers generated correspondingly to the quantity of light made incident on the opening. Further, each photodiode allows a voltage corresponding to photocarriers generated during a predetermined period to be read out to an analog memory 10 connected via an electrode for each pixel, through the transfer circuit driven by the transfer signal TS. Here, the reset signal RS and the transfer signal TS are supplied in common to the circuit which forms each pixel signal, and thereby each pixel signal is generated at the same timing. Note that in FIG. 6, reference characters TWR, TWG and TWB denote the driving periods of φLR, φLG and φLB, respectively. In this way, by driving with the pulse width corresponding to the emitted light quantity of each light emitting element, it is possible, as shown by an output signal OS in FIG. 6, to obtain RGB signals in which white balance is adjusted and the respective signal levels of RGB are arranged in a uniform manner.

In this way, the pixel signal transferred to the analog memory 10, is successively addressed in accordance with outputs of a shift register 12 driven by a clock signal CLK, and outputted to the external unit via an output circuit 11. The pixel signal outputted in this way has a different color component for each pixel array based on the above described spectral characteristics of the color filters and the light emitting elements. Here, the signal line drawn from the output circuit 11 is commonly used as shown in FIG. 5. The signal OS outputted to the signal line is outputted for each color component in the order such as of R1, G1, B1, R2, G2, B2, . . . , as shown in FIG. 6 on an enlarged scale, on the basis of a so-called point sequential system.

As described above, in the color CIS unit according to the present embodiment 1, in which light emitting elements for each color of RGB and color filters corresponding to the color of the respective light emitting elements are provided, in which the overlapping portions of the emission spectra of wavelengths of the three light emitting elements are set to be reduced, and in which the spectral transmittance of the color filters is set so as to reduce the overlapping portions of the respective transmission wavelength regions of the color filters, the outputs of sensor IC with respect to the light from the respective light emitting elements can be independently obtained for each color of RGB.

Further, even in the case where three light emitting elements 1-$r$, 1-$g$ and 1-$b$ of the light source 1 are simultaneously driven and thereby simultaneously turned on within the operating cycle TW of the sensor IC (period shown by TWB in FIG. 6), the outputs of sensor IC with respect to the light from the respective light emitting elements can be independently obtained for each color of RGB. This is the greatest feature of the present embodiment 1, which makes it possible to freely change the signal ratio of RGB color components without depending on the spectral sensitivity of the sensor IC, or on the light emission intensity of each light emitting element.

Further, as described above, in the present embodiment 1, before an original is read, a predetermined white color reference is read, and the pulse width of drive signals φLR, φLG and φLB of the respective light emitting elements is controlled so as to make output levels of the respective pixel arrays of RGB substantially uniform. Here, the light emission periods of the respective light emitting elements 1-$r$, 1-$g$ and 1-$b$ are changed to be different from each other within the time period TW, thereby enabling the light quantity of light emitting element of each color to be adjusted. In the example of FIG. 6, the relationship between the light emission periods is set as TWR>TWG>TWB. Thus, each light emitting element can be driven in the state where the amplification factor of photoelectric converter for each color is fixed. Thereby, it is possible that while white balance is made to correspond to a predetermined white color reference, the signal output ratios (S/N ratios) of the sensors to the noise level are also set to be almost equal to each other. Further, it is possible to arbitrarily adjust the white balance independently of the chromaticness of the white color reference.

Further, in order to accurately correct the color misalignment caused by the above described inter-line delay, it is preferred to set the drive start timing and the drive period of each light emitting element to a fixed period, respectively, and to thereby make reading positions for each color approximately the same.

Figure 7A:
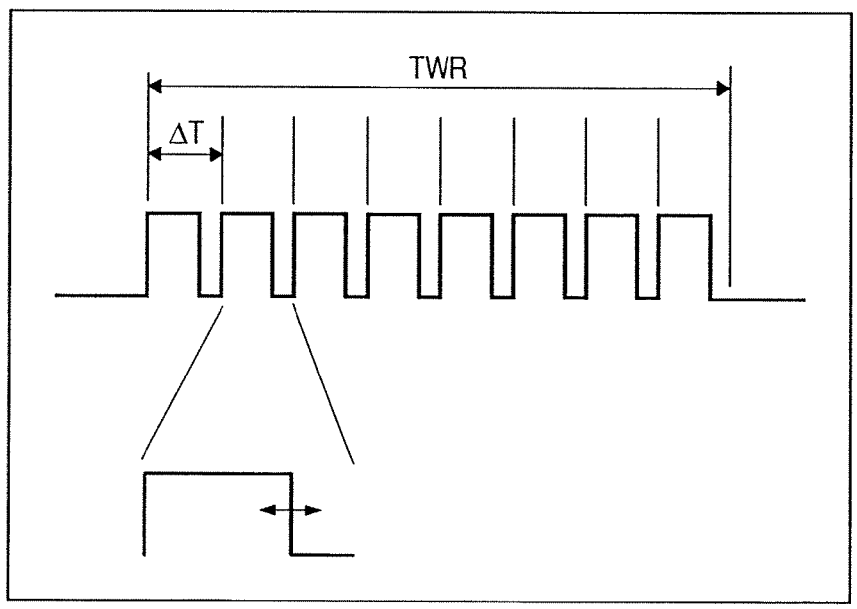
FIG. 7A is a figure explaining a method for adjusting the light quantity of each light emitting element by changing the duty ratio between the respective light emitting elements, while making the lighting timings and lighting periods of the respective light emitting elements almost equal to those in FIG. 6.
Figure 7B:
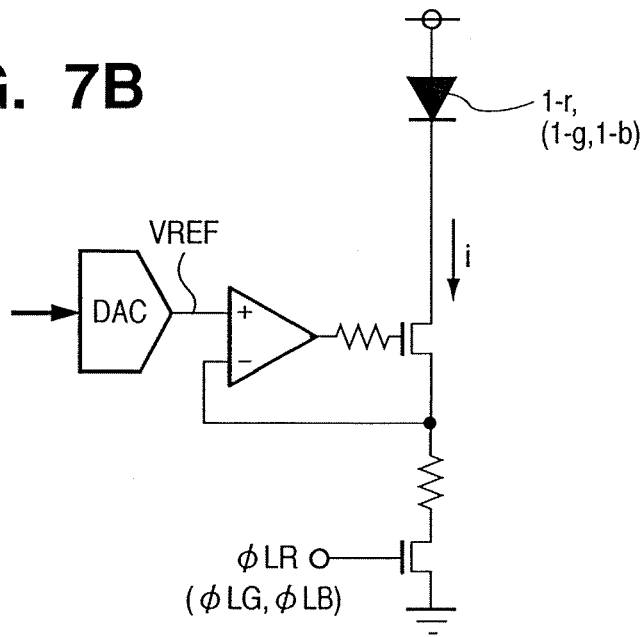
FIG. 7B is a figure explaining a method for adjusting the light quantity of respective light emitting elements by the current value of the respective light emitting elements, while making the lighting timings and lighting periods of the respective light emitting elements almost equal to those in FIG. 6.

FIG. 7A and FIG. 7B are figures explaining a method for adjusting the light quantity of each light emitting element while the lighting timing and lighting period of each light emitting element are made almost equal to those in FIG. 6.

FIG. 7A shows an example in which the drive period TWR of the light emitting element 1-$r$ is divided into plural block periods ΔT, and in which a duty ratio of on/off of lighting in each block period is controlled so as to adjust the light quantity of light emitting element 1-$r$. Note that in the case of the light emitting elements of other colors, the emitted light quantity can also be similarly controlled, but the explanation thereof is omitted here.

In this case, the drive circuit of the light emitting element is the same as that shown in FIG. 2, and the light quantity of light emitting element 1-$r$ can be adjusted while the predetermined lighting period TWR is fixed. This enables the light emission time of the red light emitting element 1-$r$ to be arbitrarily changed within the maximum period of TWR. Further, the light quantity can be independently changed for the light emitting element of each color, thereby enabling the balance between the output signal levels for respective RGB to be adjusted.

FIG. 7B shows a constitution of a circuit in which a constant current circuit is incorporated in the drive circuit of the respective light emitting elements 1-$r$, 1-$g$ and 1-$b$, and in which the current through each light emitting element is controlled by a drive signal with a fixed period, so as to adjust the light quantity.

In the figure, an example of control circuit for the one light emitting element 1-$r$ is shown, for example, but the constitution in the case of the other light emitting elements is also the same as that shown in this figure. In the figure, a reference voltage VREF for constant current is controlled by an output of a D/A converter (DAC). This DAC receives a digital signal from a control section 1000 (FIG. 10), and generates a voltage corresponding to the digital value. In this way, the quantity of current which flows through the light emitting element 1-$r$ is controlled, when one drive signal φLR is turned on. Thereby, in the color CIS unit according to the present embodiment 1, it is possible to independently control the light quantity of the light emitting element of each color, while making the lighting periods of the respective light emitting elements substantially fixed. This enables the color balance to be easily adjusted.

As described above, according to the present embodiment 1, it is possible to adjust the sensitivity of sensor IC by adjusting the spectral characteristics of the light source of each color and of the sensor of each color. This enables the output level and the S/N ratio of each color component of RGB to be substantially fixed, and thereby the image quality to be improved.

Further, this makes it possible to easily adjust white balance by using a reference white point, and to easily adjust the chromaticness in an output image as a CIS unit.

Embodiment 2

Figure 8:
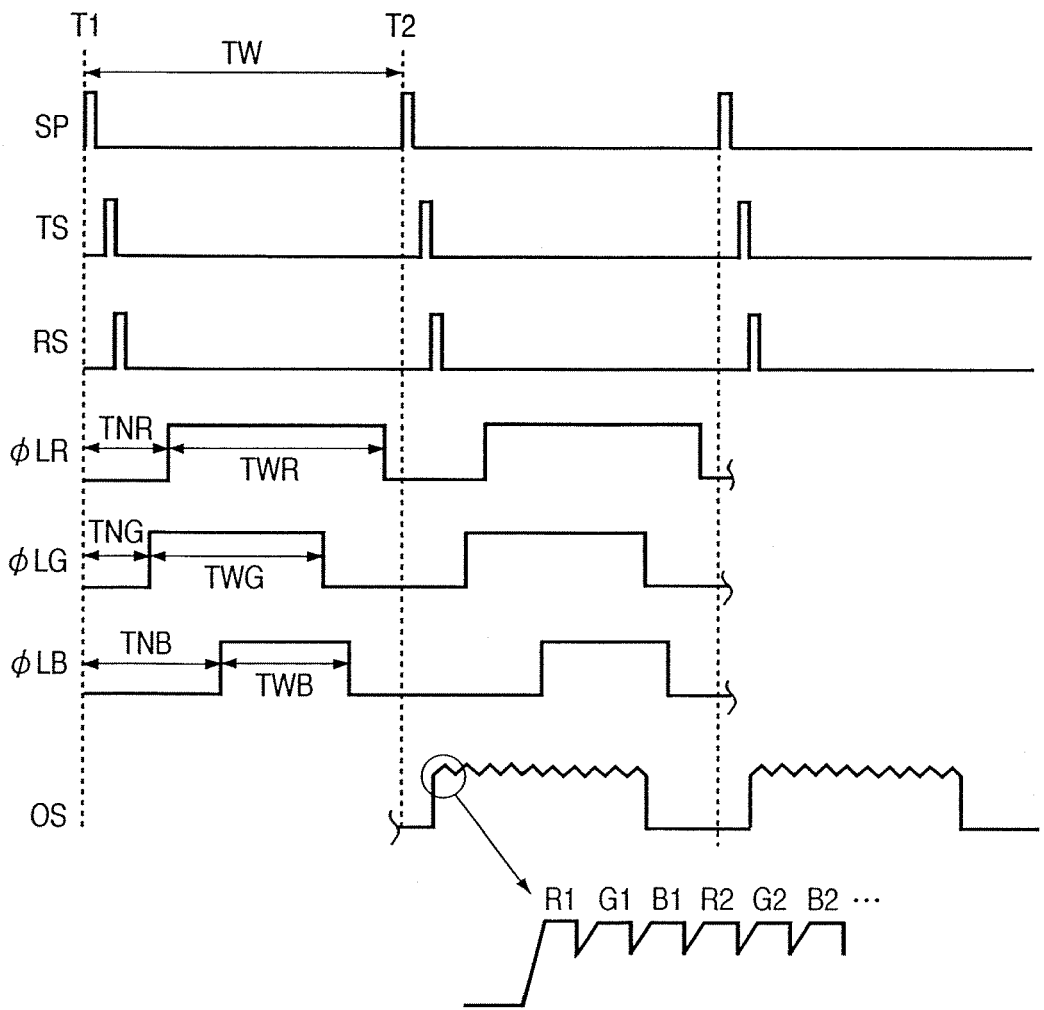
FIG. 8 is a timing chart explaining a drive timing of a color CIS unit according to an embodiment 2 of the present invention.

Next, an embodiment 2 according to the present invention is described with reference to FIG. 8.

A constitution of a color sensor according to the present embodiment 2 is the same as that of the above described embodiment 1, but is different in the method for driving each of three light emitting elements 1-$r$, 1-$g$ and 1-$b$ which constitute the light source, that is, different in the light emission start timing. The three light emitting elements 1-$r$, 1-$g$ and 1-$b$ have an independent drive circuit, respectively. The lighting start timing and the lighting period of the three light emitting elements are independently controlled, during one operating cycle TW, by drive signals φLR, φLG and φLB which correspond to the three light emitting elements, respectively. For example, in the example shown in FIG. 8, the drive signal φLR of the light emitting element 1-$r$ is turned on after a period TNR from the rise time of the signal SP, and is set at a high level during a period TWR. This makes the light emitting element 1-$r$ turned on after the period TNR from the rise time of the signal SP, and continuously turned on during the period TWR. Similarly, also in the case of other light emitting elements 1-g and 1-b, the light emitting element 1-g is turned on after a period TNG from the rise time of the signal SP, and continuously turned on during the period TWG, and the light emitting element 1-b is turned on after a period TNB from the rise time of the signal SP, and is continuously turned on during the period TWB.

This technique is explained in conjunction with the case of the sensor IC according to the present embodiment 2. In this sensor IC, an interval x between the pixels is equal to an interval y between the pixel arrays.

FIG. 9A to FIG. 9D are schematic illustrations for explaining relationships between the light emission timings of the light emitting elements and image signals read by the respective pixel arrays, in correspondence with the resolution in the subscanning direction.

Figure 9A:
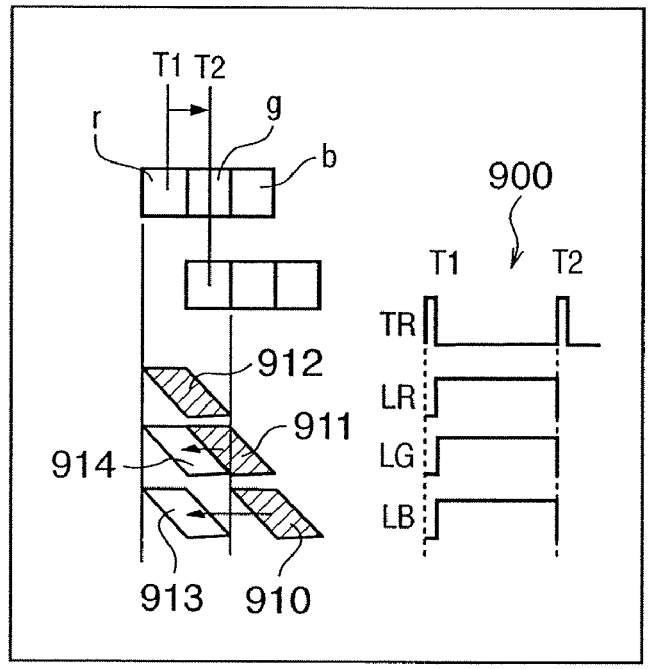
FIG. 9A is a schematic illustration explaining a relationship between the light emission timing of light emitting elements and image signals read by respective pixel arrays, in correspondence with the resolution in the subscanning direction.

FIG. 9A shows a case where the basic resolution, i.e., the resolution in the main scanning direction is equal to the resolution in the subscanning direction. Note that in this example, a case where the CIS with the sensor arrays shown in FIG. 5 is used and an original is fed upward from a lower part in FIG. 5, is explained. Thus, in this case, a reading operation of a certain line is first performed by the B pixel array 503, and then reading operations are successively performed by the G pixel array 502 and the R pixel array 501. In this example, as denoted by reference numeral 900, the lighting start timings and the lighting periods of the respective light emitting elements of RGB within one operating cycle period TW are set equal to each other. In FIG. 9A, reference numerals 910, 911 and 912 denote image signals for one line read by B pixel array 501, G pixel array 502, and R pixel array 503, respectively. In this case, correspondingly to the reading positions of the respective pixel arrays, the line signal 910 of B is first read, then, the line signal 911 of G is read with a delay by one line, and the line signal 912 of R is finally read with a delay by two lines. Thus, the line signal of G is delayed by the period of 1TW, as denoted by reference numeral 914, and the line signal of B is delayed by the period of 2TW, as denoted by reference numeral 913. Thereby, the positions of image signals of respective colors in the subscanning direction are made coincident with each other, so that the color misalignment can be corrected.

Figure 9B:
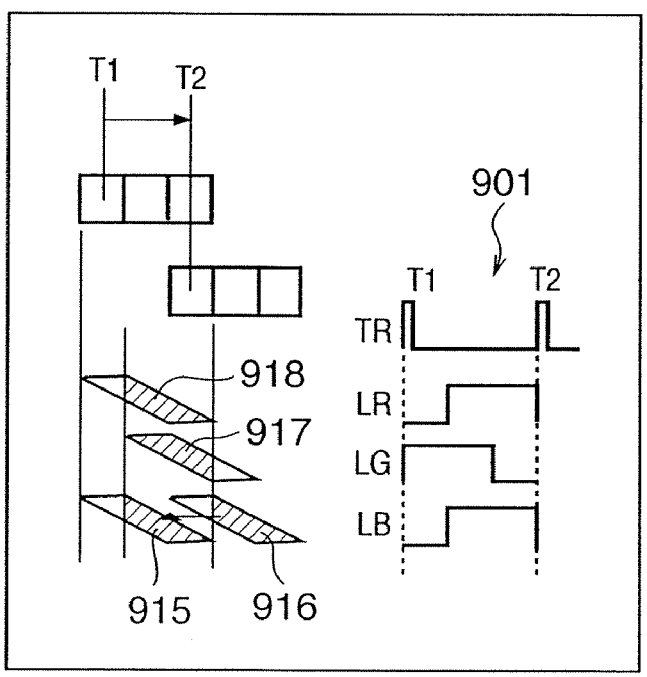
FIG. 9B is a schematic illustration explaining a relationship between the light emission timing of light emitting elements and image signals read by respective pixel arrays, in correspondence with the resolution in the subscanning direction.

Next, FIG. 9B shows a case where the scanning speed in the subscanning direction is doubled, and the reading operation is performed by the resolution in the subscanning direction which is set to half the resolutions in the main scanning direction. In this case, as denoted by reference numeral 901, each of the delays TNR, TNG and TNB from SP to the lighting start of respective light emitting elements is set as TNR=TW/3, TNG=0, and TNB=TW/3.

Further, each lighting period is set as TWR=TWG=TWB≦(⅔)TW.

In FIG. 9B, reference numerals 916, 917 and 918 denote image signals for one line read by B pixel array 503, G pixel array 502, and R pixel array 501, respectively. In this case, ⅔ of the reading positions of the latter half of R pixel array and ⅔ of the reading positions of the first half of G pixel array are made coincident with each other. Further, when the line signal 916 of B is delayed by a period of 1TW and ⅔ of the latter half of the signal line 916 of B is taken out, as denoted by reference numeral 915, the reading positions on the original for respective pixel arrays are made coincident with each other, and thereby the generation of the color misalignment in an output image is eliminated.

Figure 9C:
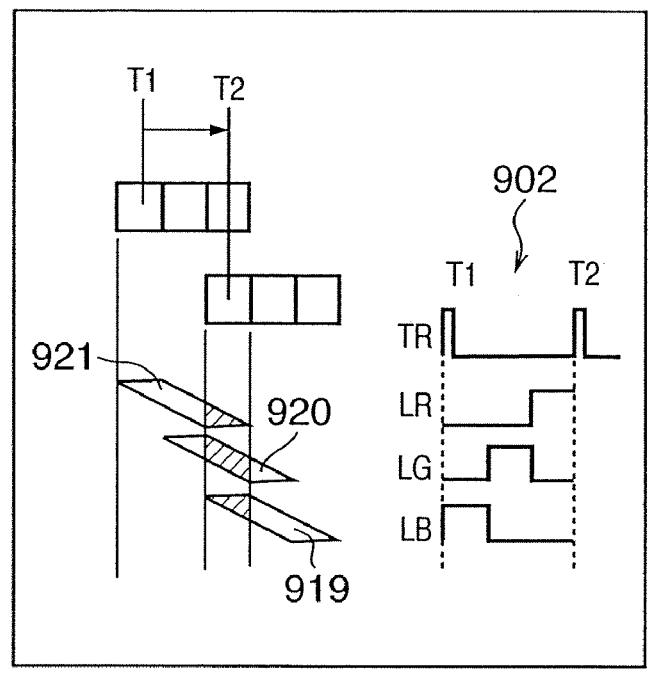
FIG. 9C is a schematic illustration explaining a relationship between the light emission timing of light emitting elements and image signals read by respective pixel arrays, in correspondence with the resolution in the subscanning direction.

Further, in FIG. 9C, the scanning speed in the subscanning direction is doubled similarly to the case in FIG. 9B, and the lighting period of each of the light emitting elements is set to TW/3, as denoted by reference numeral 902, and the light emission timings of the light emitting elements are shifted as shown in FIG. 9C. Here, delays TNR, TNG and TNB from SP to the lighting start of respective light emitting elements within the period of TW, are set as TNR=2TW/3, TNG=TW/3, and TNB=0, respectively. Further, the lighting periods of the light emitting elements are set as TWR=TWG=TWB≦TW/3.

Reference numerals 919, 920 and 921 denote image signals for one line read by B pixel array 503, G pixel array 502 and R pixel array 501, respectively. In this case, ⅓ of the reading positions of the first half of B pixel array, ⅓ of the reading positions of the middle of G pixel array, and ⅓ of the reading positions of the later half of R pixel array are made coincident with each other.

Thus, according to the present embodiment 2, the respective RGB pixel arrays of CIS are capable of reading the same position on the original. Further, as shown in FIG. 9C, by setting the reading periods of the respective pixel arrays to ⅓ of the period of TW, and by shifting the reading periods of the respective pixel arrays by ⅓ of the period TW, respectively, the line memory unit for color misalignment correction can be eliminated, and thereby the circuit constitution of sensor IC can be simplified.

In the present embodiment 2, in order to enable the respective pixel arrays to read the same position on the original, the signals detected by the respective pixels are adjusted by the driving method of the three light emitting elements 1-r, 1-g and 1-b constituting the light source. Thereby, it is possible to eliminate the need for adjusting the distance y between the pixel arrays to an integral multiple of the distance x between the pixels in the pixel arrangement of the sensor IC shown in FIG. 3, and hence, to arbitrarily set the distance y. This makes it possible to reduce restrictions on the layout of the sensor IC and to reduce the area of the sensor IC, which significantly contributes to the lowering of the cost of the sensor IC.

Further, the reduction in the lighting period of the respective light emitting elements results in the reduction in the effective area of pixel openings in the subscanning direction. As a result, the resolution in the subscanning direction is improved so that excellent image quality can be obtained.

As described above, according to the present embodiment 2, even in the case where the scanning speed in the subscanning direction is changed so as to change the resolution in the subscanning direction, the reading positions of the respective RGB color pixel arrays on an original can be arbitrarily changed by changing the lighting period of the three light emitting elements 1-r, 1-g and 1-b during one operating cycle period. Thereby, the reading positions are eventually made coincident with each other, and the color misalignment can be eliminated.

Embodiment 3

By using the driving method of the light source according to the above described embodiment 2, the interval y between the pixel arrays in the subscanning direction can be arbitrarily set independently of the interval x between the pixels. In the case where the interval y between the pixel arrays is set smaller than the interval x between the pixels, the inter-line delay processing for correcting the color misalignment can be eliminated, even when the reading operation is performed on the basis of the basic resolution of sensors which is determined by the interval x between the pixels.

Figure 9D:
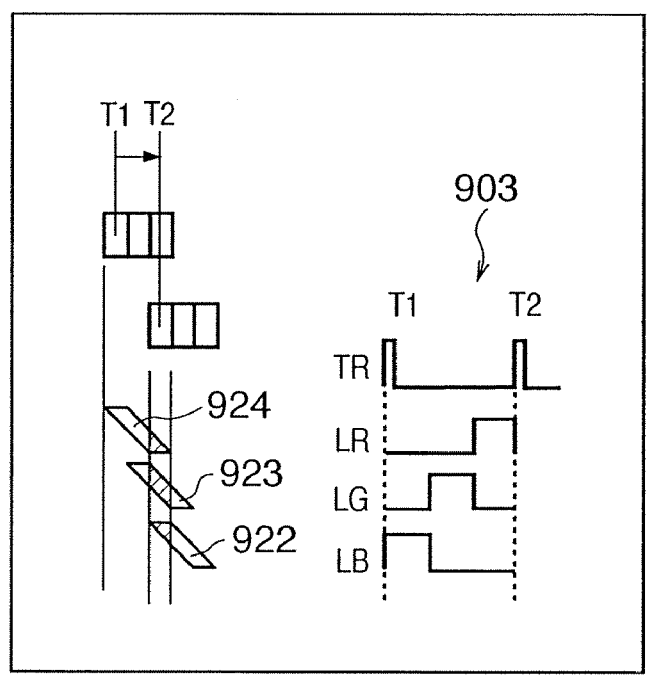
FIG. 9D is a schematic illustration explaining a relationship between the light emission timing of light emitting elements and image signals read by respective pixel arrays, in correspondence with the resolution in the subscanning direction.

FIG. 9D is a figure showing an operation timing when the resolution in the main scanning direction is equal to the resolution in the subscanning direction. For example, a case where the interval y between the pixel arrays is set to ½ of the interval x between the pixels is considered. Also in this case, the delay periods TNR, TNG and TNB which determine the lighting start timings of the respective light emitting elements within one operating cycle period TW, are set as TNR=2TW/3, TNG=TW/3, and TNB=0, respectively. Further, the lighting periods of the respective light emitting elements are set as TWR=TWG=TWB≦TW/3 (see reference numeral 903).

Reference numerals 922, 923 and 924 denote image signals for one line read by B pixel array 503, G pixel array 502 and R pixel array 501, respectively. In this case, ⅓ of the reading positions of the first half of B pixel array, ⅓ of the reading positions of the middle of G pixel array, and ⅓ of the reading positions of the latter half of R pixel array are made coincident with each other. This makes it possible to correct the color misalignment in the output image signals without using the line memory unit for delaying the image signals.

That is, in the case where the interval y between the pixel arrays is set to be smaller than the interval x between the pixels, the lighting start timings and the lighting periods of the respective light emitting elements within one operation cycle period TW are controlled at the time when an original is read in the state where the resolution in the main scanning direction is equal to the resolution in the subscanning direction. Thereby, it is possible that the inter-line delay processing for correcting the color misalignment can be eliminated, and that the respective pixel arrays are capable of reading the same positions on the original within one operating cycle period without using the line memory unit. This enables the signal processing to be simplified and the cost to be reduced. Note that the reading light quantity is reduced by shortening the lighting periods of the respective light emitting elements, but the reading resolution of an original can be significantly improved.

Embodiment 4

Figure 10:
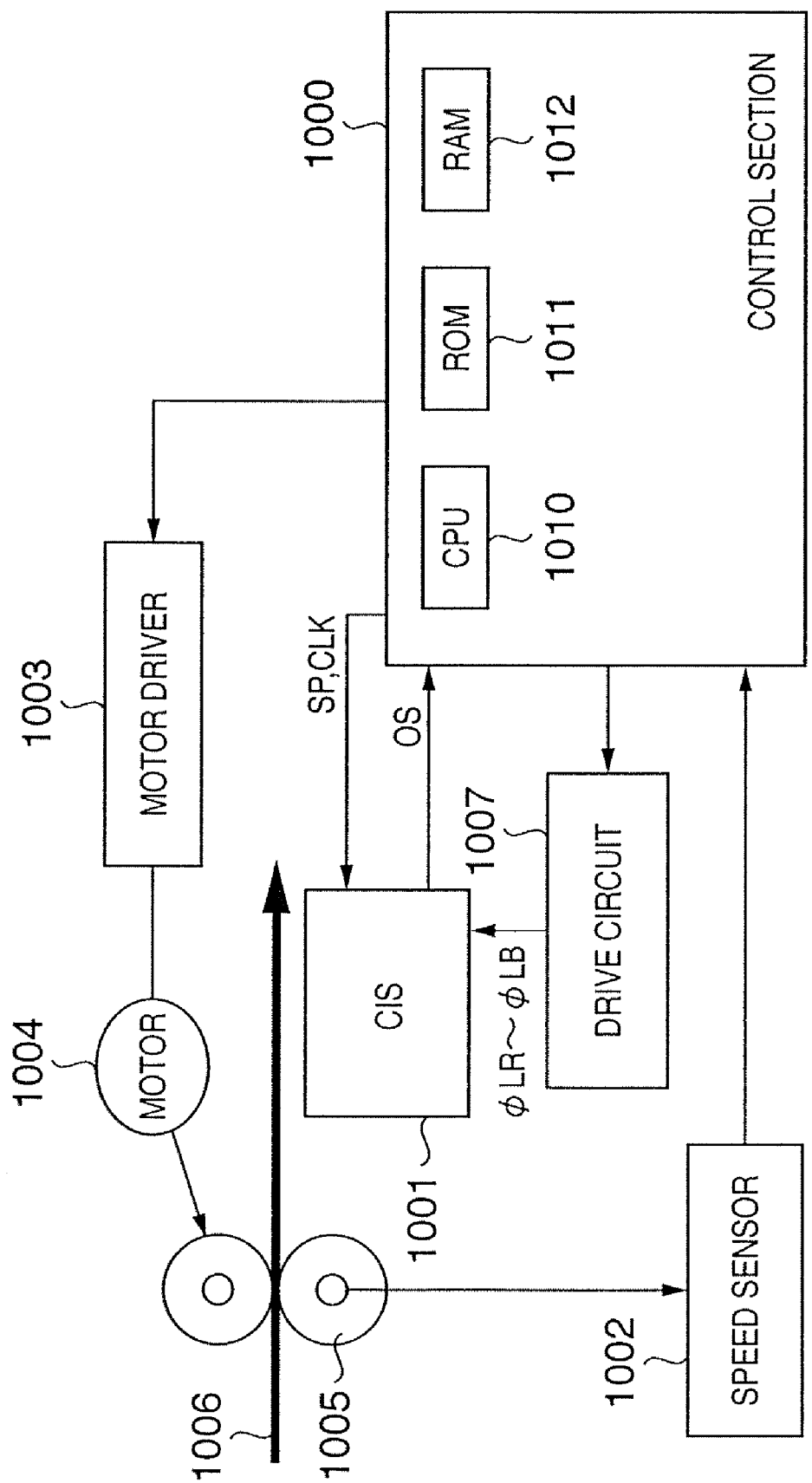
FIG. 10 is a block diagram showing a constitution of an image reading apparatus in which the color CIS unit is used, according to an embodiment 4 of the present invention.

FIG. 10 is a block diagram showing a constitution of an image reading apparatus in which a color CIS unit 1001 according to an embodiment 4 of the present invention is used.

In the figure, a control section 1000 comprises a CPU 1010, a ROM 1011 storing a program executed by the CPU 1010, and a RAM 1012 used as a work area when the CPU 1010 performs control and temporarily storing various data, and performs control of the image reading apparatus. Note that the above described line memory for delaying image signals in the unit of one line is provided in the RAM 1012. Reference numeral 1001 denotes the color image contact sensor (CIS) unit according to the above described present embodiment, which makes the light emitting elements turned on by drive signals (φLR to φLB) from a drive circuit 1007, and outputs a read signal OS of RGB. A speed sensor 1002 detects the feeding speed of an original 1006 to be read on the basis of the rotation amount of a drive roller 1005 for feeding and driving the original 1006, or the moving speed of the original 1006. A motor driver 1003 makes a motor 1004 driven and rotated on the basis of an instruction from the control section 1000, for feeding and driving the original 1006. The drive circuit 1007 is a circuit which drives the light sources of the CIS unit 1001, and comprises, as shown in FIG. 2, FETs (switching elements) which make the light emitting elements of respective colors turned on and off in accordance with the respective drive signals φLR to φLB for the light emitting elements. Further, the drive circuit 1007 has a constant current circuit as shown in FIG. 7B, as described above, and is capable of controlling the emitted light quantity of each light emitting element by changing the drive current.

Here, the control section 1000 receives information on the feeding speed of the original 1006 detected by the speed sensor 1002. The control section 1000 instructs the lighting start timing and the lighting-off timing to the light emitting elements for respective RGB colors in the CIS 1001 in accordance with the received speed information. The control section 1000 also supplies a signal SP for instructing the start of storage of image information and a clock CLK to the sensor section provided on the sensor IC.

Thereby, the control section 1000 performs control so as to set a predetermined reading condition and to enable an image to be read by the CIS unit 1001, in accordance with the feeding speed of the specified original. This makes it possible to prevent the color misalignment of image signals of respective color components. Further, since the feeding speed of the original 1006 is always detected by the speed sensor 1002, it is possible to cope, in real time, with the change in the feeding speed of the original caused by mechanical vibrations and the like. This makes it possible to prevent the color misalignment due to the variation in the feeding speed of the original, and also the local color misalignment from being caused.

Figure 11:
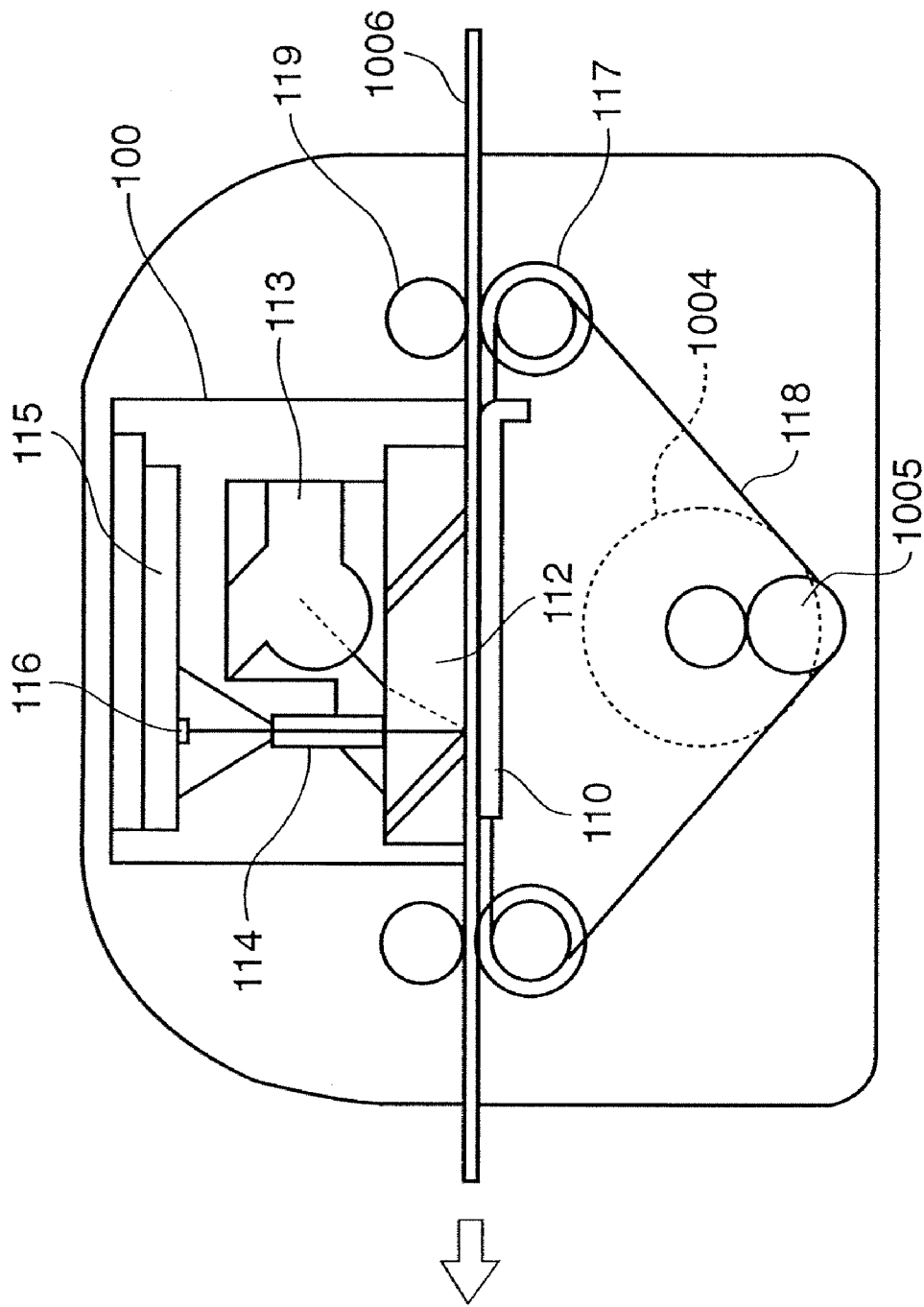
FIG. 11 is a block diagram showing a constitution of a sheet feeding type scanner apparatus which is an example of the image reading apparatus according to the embodiment 4 of the present invention.

FIG. 11 is a block diagram showing a constitution of a sheet feeding type scanner apparatus which is an example of the image reading apparatus according to the embodiment 4 of the present invention.

In the figure, the original illuminating light emitted from a light guide member 113 is transmitted through a contact glass 112, and linearly illuminates the original 1006. The reflected light from the original 1006 is converged by a lens array 114, so as to be formed as an image on a sensor IC 116 arranged on a sensor substrate 115. The sensor IC 116 generates and outputs an electric image signal in accordance with the formed image.

The original 1006 is fed by an original feeding belt 118 which is fed in a gap between a guide plate 110 and the contact glass 112 by the rotation of the drive motor 1004. It is possible to change the feeding speed of the original 1006 by changing the rotation speed of the drive motor 1004. Note that the above described speed sensor 1002 may detect the feeding speed of the original 1006 on the basis of the moving speed of the original feeding belt 118.

Here, the feeding speed of the original 1006 is determined in accordance with the reading resolution and the like, in a manner explained on the basis of the block diagram in FIG. 10. On the other hand, the feeding speed is detected in real time, and the information on the feeding speed is fed back to the light emitting elements and the reading condition of the sensor IC of the CIS unit 1001 which is the original reading section. This makes it possible to set the reading condition so as to eliminate the color misalignment in the image signals of respective RGB.

In the original reading apparatus according to the present embodiment, the light emission condition of the light emitting elements of three colors of RGB, and the fetch timing of the read signals are suitably adjusted in accordance with the feeding speed of an original, thereby making it possible to obtain an excellent image signal without color misalignment even when the feeding speed of the original is changed or the feeding unevenness is caused.

Figure 12:
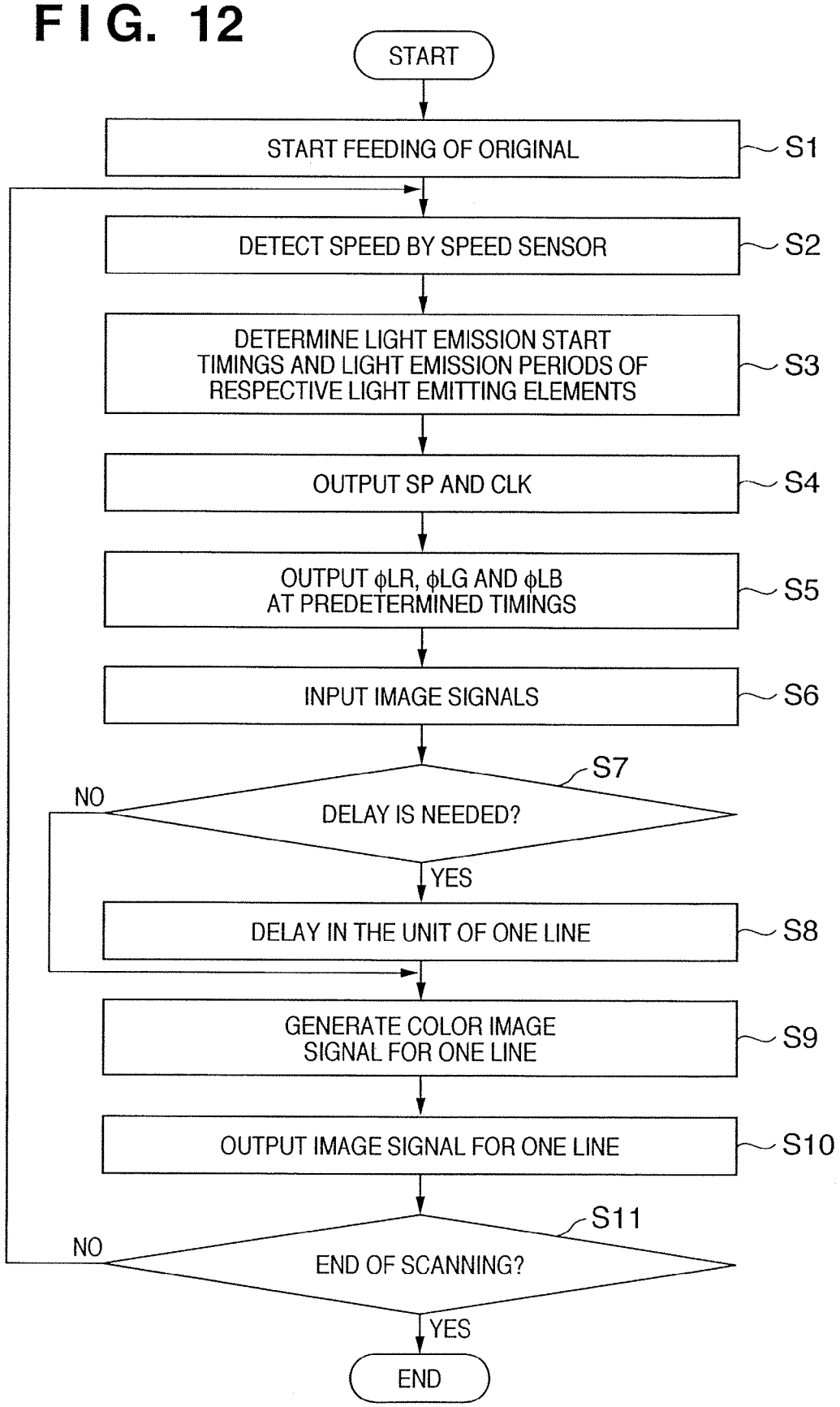
FIG. 12 is a flow chart explaining reading control of an original in the image reading apparatus according to the present embodiment 4.
Figure 13A:
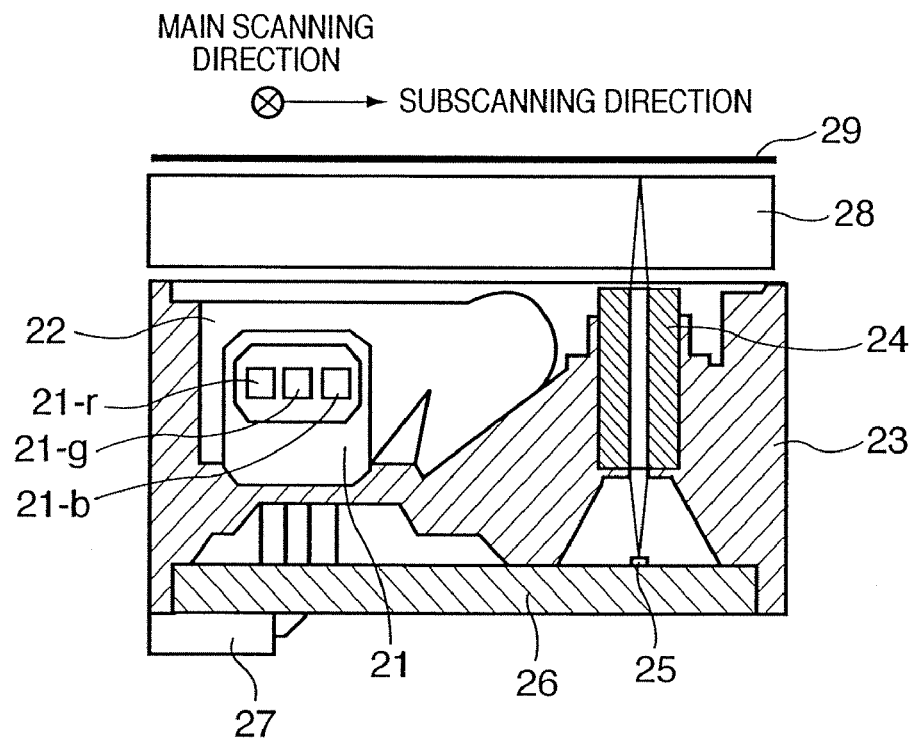
FIG. 13A depicts a sectional view of a conventional CIS unit.
Figure 13B:
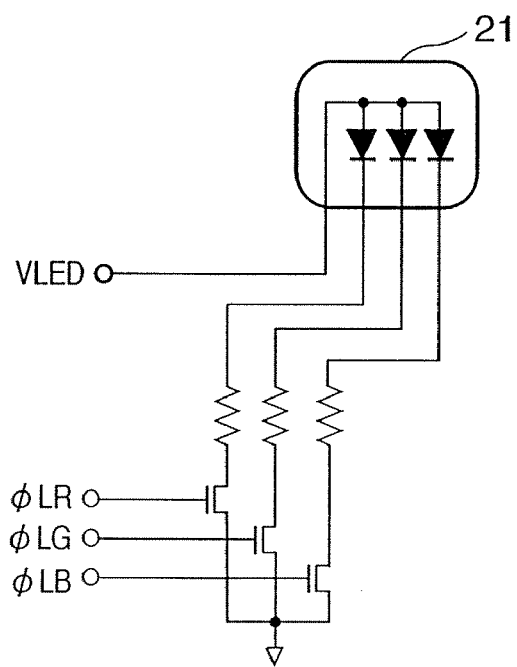
FIG. 13B depicts a drive circuit of a light source of the conventional CIS unit.
Figure 15:
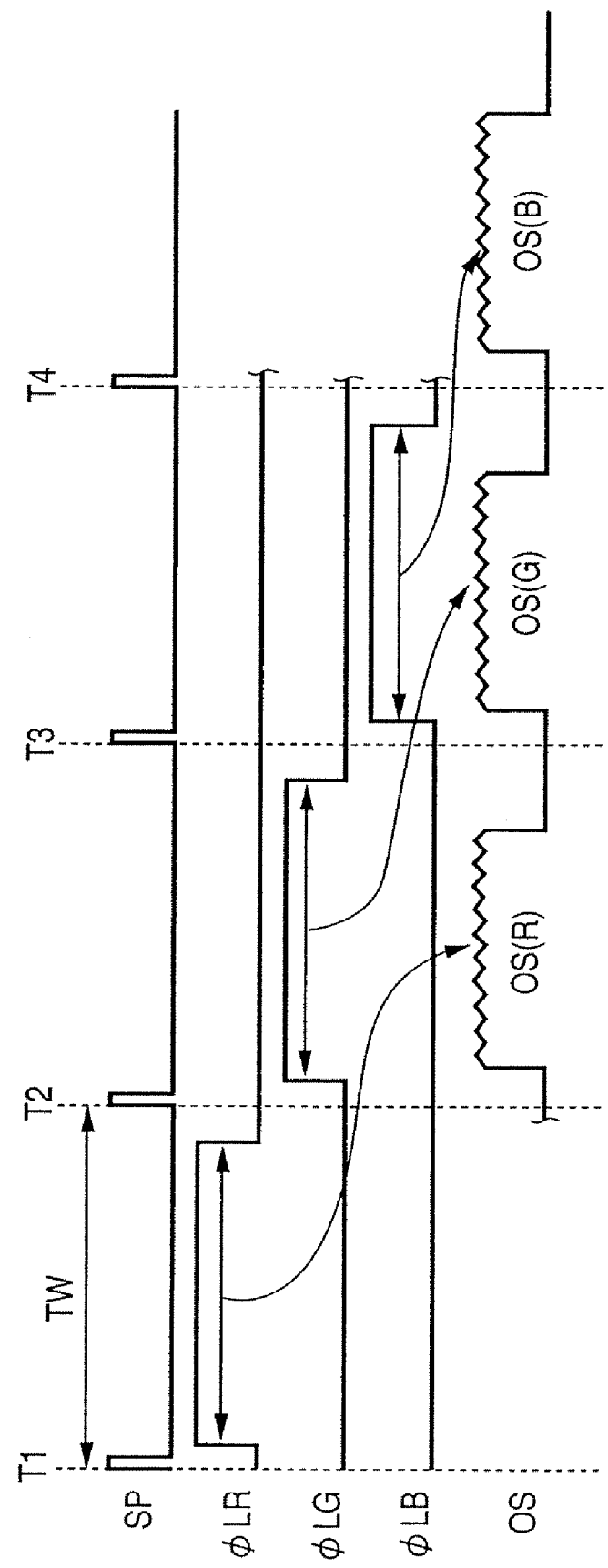
FIG. 15 is a figure explaining an operation timing of the conventional CIS.
Figure 16A:
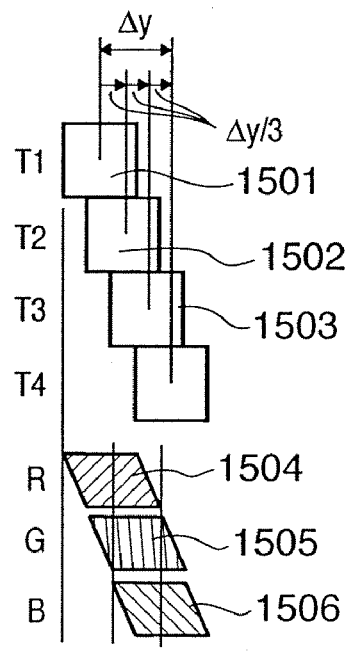
FIG. 16A is a schematic illustration explaining a deviation between a pixel in reading and a reading position, based on a prior art.
Figure 16B:
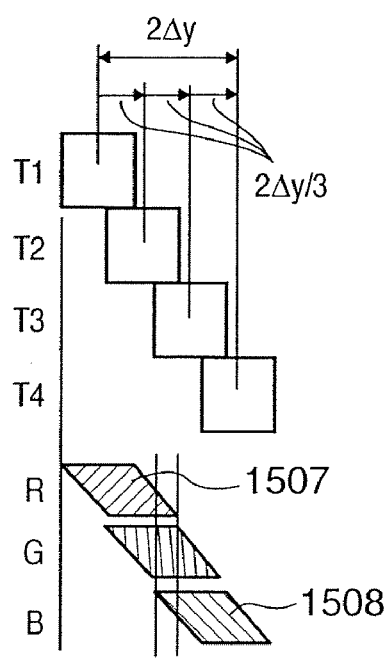
FIG. 16B is a schematic illustration explaining a deviation between a pixel in reading and a reading position, based on the prior art.
Figure 17:
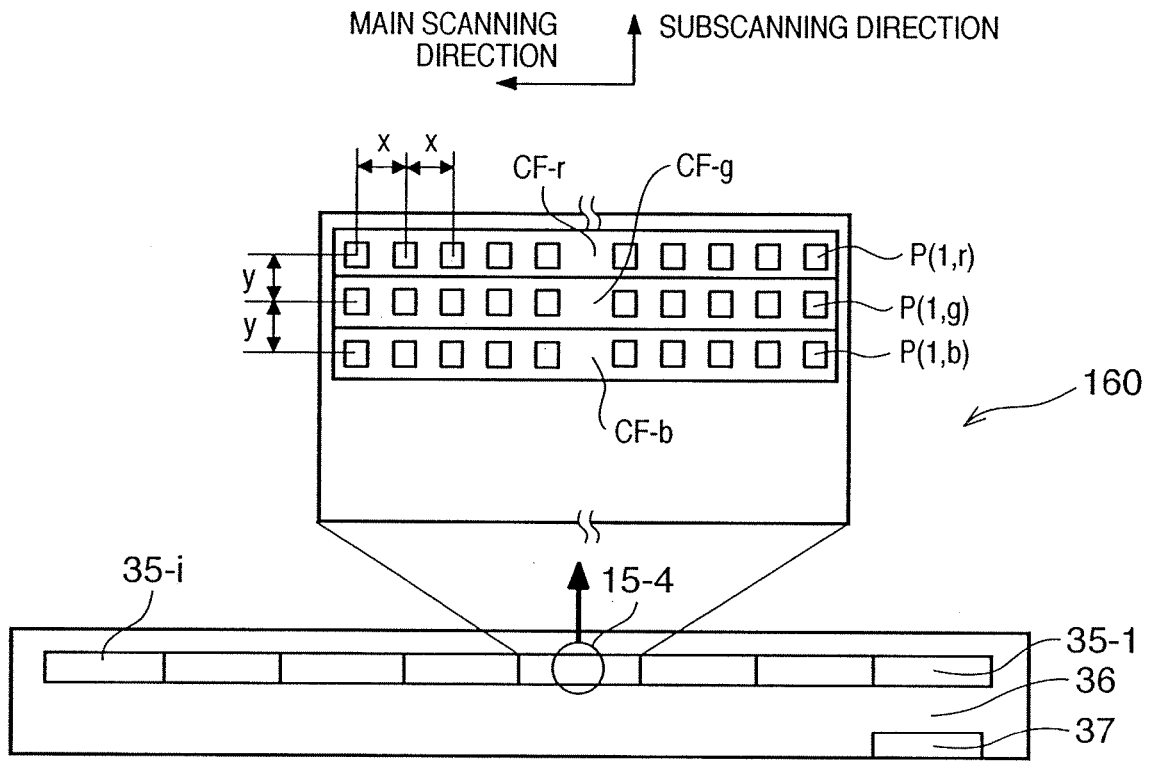
FIG. 17 depicts an external view of a conventional sensor array in the main scanning direction.
Figure 18:
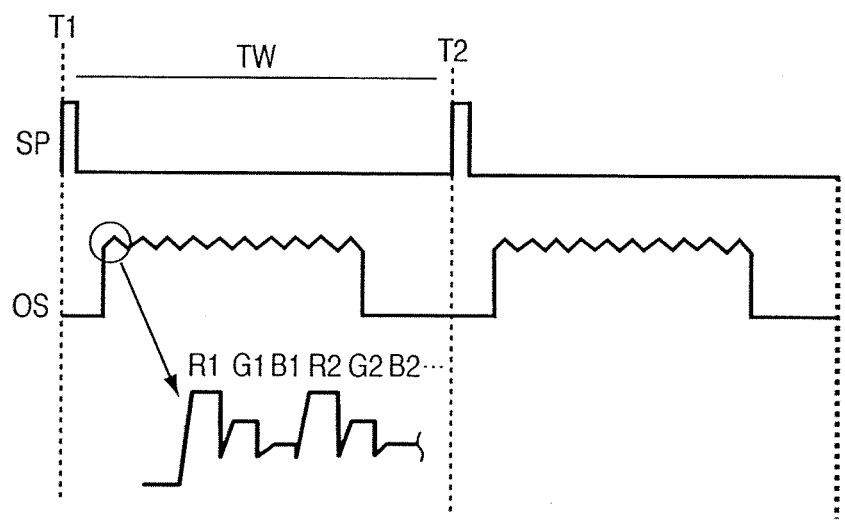
FIG. 18 is a figure showing an operation timing of the color CIS unit shown in FIG. 17.
Figure 19A:
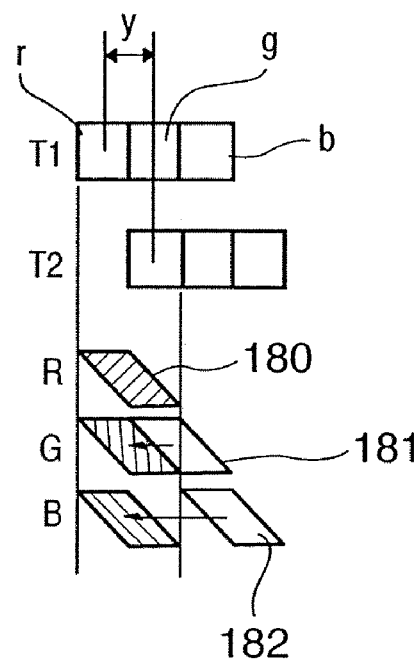
FIG. 19A is a schematic illustration explaining a deviation of reading positions on an original in the subscanning direction.
Figure 19B:
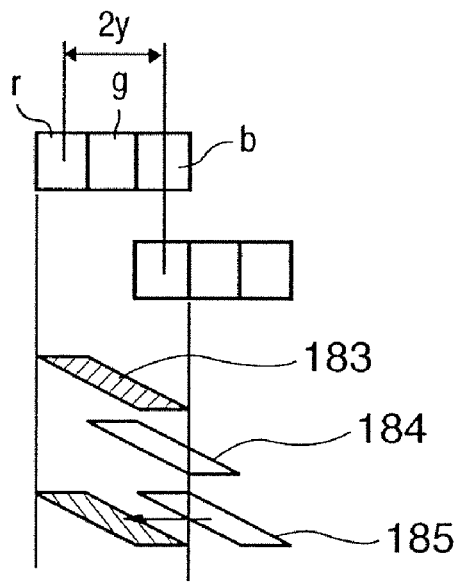
FIG. 19B is a schematic illustration explaining a deviation of reading positions on the original in the subscanning direction.

FIG. 12 is a flow chart explaining the reading control of an original in the image reading apparatus according to the present embodiment 4. The program for performing this processing is stored in the ROM 1011 in the control section 1000, and is executed under the control of the CPU 1010.

It is assumed that before the processing is started, the reading resolution in the subscanning direction is specified. When the processing is started by the instruction for the reading of an original from an operation section (not shown) of the image reading apparatus, or from a PC connected with the image reading apparatus, first, in step S1, the rotational drive of the motor 1004 is started so as to make an original fed at a feeding speed corresponding to the reading resolution in the subscanning direction, and then the feeding of the original is started. In step S2, the feeding speed of the original is detected by the speed sensor 1002. In step S3, the light emission start timing and the lighting period of the respective light emitting elements are determined in accordance with the detected feeding speed of the original. In step S4, the signal SP and the clock (CLK) signal are outputted to the CIS unit 1001 in order to enable the reading of the original to be performed. In step S5, the respective drive signals φLR to φLB are outputted to the CIS unit 1001 at the timing based on the light emission start timing and the lighting period of the respective light emitting elements, which are determined in step S2. Then, in step S6, the image signal OS outputted from the CIS 1001 is inputted. In step S7, for example, as in the above described cases shown in FIG. 9A and FIG. 9B, it is determined whether or not the delay of the image signal in the unit of one line is needed. When the line signal needs to be delayed, the process proceeds to step S8, and for example, in the case of FIG. 9A, the line signal of B is delayed by two lines, and the line signal of G is delayed by one line, and the process proceeds to step S9. On the other hand, as shown in FIG. 9C and FIG. 9D when the line signal need not be delayed, the process skips step S8 and proceeds to step S9. In step S9, an image signal for one line is generated on the basis of image signals outputted for each color component by the point sequential system. Here, when the delayed color component signals need to be composed, the compositing process is also performed. In step S10, the generated image signal for one line is outputted to an external unit. In step S11, it is determined whether or not the reading of the original is finished. If it is determined that the reading of the original is not finished in step S11, the process returns to step S2 and the above described processing is repeated. Note that when the feeding speed of the original detected in step S2 is not the predetermined feeding speed (corresponding to the resolution in the subscanning direction), the feeding speed of the original is naturally controlled in accordance with the detected feeding speed, i.e., the rotation of the motor 1004.

As described above, according to the present embodiment, it is possible to reduce the level difference between output signals for the respective pixel arrays due to the spectral sensitivity of the sensors, the spectral transmittance of the filters, the luminous efficiency of the respective light emitting elements, and the like, by adjusting the light quantity of the respective light emitting elements. This enables the S/N ratio of the output image to be fixed, so that a stable image can be obtained. Further, this also enables white balance to be adjusted in the color CIS unit, and thereby the chromaticness to be easily adjusted.

Further, according to the present embodiment, the lighting start timing and the lighting period of each of the light emitting elements 1-r, 1-g and 1-b, which has a different wavelength, are individually adjusted within one operating cycle TW of the color CIS unit, in accordance with the resolution in the subscanning direction. This enables the image information at the same subscanning position of the original to be read without using the line memory unit, or by delaying in the unit of one line with the use of the line memory. As a result, an image signal without color misalignment can be obtained.

Further, by performing the control according to the present embodiment, it is possible to eliminate the need for setting the interval y between the pixel arrays of the sensor IC which has three pixel arrays, to an integral multiple of the interval x between the pixels. This enables the flexibility in designing the sensor IC to be increased and the cost to be reduced.

Further, according to the present embodiment, it is possible to adjust the output timing of image signal for each color by controlling the drive timing of the respective light emitting elements in accordance with the resolution in the subscanning direction, i.e., the feeding speed of the original. This makes it possible to obtain an output image without color misalignment, without using the line memory or by delaying in the unit of one line. Further, at this time, the interval y between the pixel arrays of the sensor IC which has three pixel arrays needs not be set to an integral multiple of the interval x between the pixels, so that the flexibility in designing the sensor array can be increased and the cost can also be reduced.

Note that in the present embodiment, the CIS unit using a CMOS sensor is explained. However, the present invention can be utilized even in the case where the reducing magnification is changed by using the CCD sensor of a reduction optical system.

INDUSTRIAL APPLICABILITY

The image sensor unit according to the present invention is applicable to, for example, a reading apparatus of an original, and further applicable to a scanner, color facsimile or copying machine, and also a composite machine of these. Further, the image sensor unit according to the present invention is also applicable to an image input section of a color copying machine.

While the embodiments according to the present invention have been described above, the present invention is not limited to the above-described embodiments, and it may be modified without departing from the spirit of the present invention.

CLAIM OF PRIORITY

The present application claims a right of priority based on Japanese Patent Application No. 2004-073657 filed on Mar. 16, 2004, the complete disclosure by which is incorporated herein.

The invention claimed is:

1. A color image sensor unit having a light source for illuminating an original, the light source including light emitting elements of at least three different colors; a sensor array including at least three pixel arrays, each of which has a color filter of a different color from each other and is arranged in the direction substantially perpendicular to a feeding direction of the original; and a light source drive circuit for independently turning on and off each of the light emitting elements, wherein the light source drive circuit controls lighting start time and lighting period of each of the light emitting elements in accordance with pixel arrangement positions of each of the three pixel arrays and with the feeding speed of the original.

2. The color image sensor unit according to claim 1, wherein the light source drive circuit sets a lighting start sequence of the respective light emitting elements to a color sequence of the color filters, which color sequence corresponds to the pixel arrays in the feeding direction of the original, within a reading time per one main scanning line for reading the original.

3. The color image sensor unit according to claim 1, wherein among the light emitting elements of the three different colors, a half-value width of spectral spectrum of the wavelength of the light emitting element of at least one color is narrower than a half-value width of spectral spectrum of the color filter of the same color.

4. The color image sensor unit according to claim 1, wherein the light emitting elements are LEDs.

5. An original reading apparatus comprising:
a color image sensor unit having an original scanning section for scanning an original; a light source section including light emitting elements of at least three different colors, for irradiating the original; a sensor array including at least three pixel arrays, each of which has a color filter of a different color, and which are arranged in the direction substantially perpendicular to the feeding direction of the original; and a light source driving circuit section for independently turning on and off the light emitting elements; and
an image forming section for forming an output image on the basis of image signals from said color image sensor unit,
wherein the light source driving circuit section controls lighting start times and lighting periods of each of the light emitting elements, in accordance with arrangement positions of the respective pixel arrays and feeding speed of the original by the original scanning section in the feeding direction of the original.

6. The original reading apparatus according to claim 5, wherein the light source driving circuit section sets a lighting start sequence of the respective light emitting elements to a sequence of the color filters which corresponds to the colors of the pixel arrays in the feeding direction of the original, within a time period of reading per one main scanning line by the sensor array.

7. The original reading apparatus according to claim 5, wherein the light source section has light emitting elements of different three colors and the sensor array includes three pixel arrays, each of which has a color filter of a different color from each other, the light source driving circuit section sets a difference between lighting start times of the respective light emitting elements to a time period represented by $\frac{1}{3}$ of a time period of reading per one main scanning line by the sensor array, within the time period of reading per one main scanning line.

8. A driving method of an original reading apparatus comprising a color image sensor unit having an original scanning section for scanning an original; a light source section including light emitting elements of at least three different colors, for irradiating the original; a sensor array including at least three pixel arrays, each of which has a color filter of a different color, and which are arranged in the direction substantially perpendicular to the feeding direction of the original; and a light source driving circuit section which independently turns on and off the light emitting elements; and an image forming section for forming an output image on the basis of image signals from the color image sensor unit,
wherein a lighting start time and lighting period of each of the light emitting elements is controlled in accordance with arrangement positions of the respective pixel arrays and feeding speed of the original in the feeding direction of the original.

9. The driving method of the original reading apparatus according to claim 8, wherein a lighting start sequence of each of the light emitting elements is set to a color sequence of the color filters corresponding to the pixel arrays in the feeding direction of the original, within a time period of reading per one main scanning line by the sensor array.

10. The driving method of the original reading apparatus according to claim 8, wherein the light source section has light emitting elements of different three colors and the sensor array includes three pixel arrays, each of which has a color filter of a different color from each other, a difference between a lighting start time of each of the light emitting elements is set to a time period represented by $\frac{1}{3}$ of a time period of reading per one main scanning line by the sensor array, within the time period of reading per one main scanning line.

11. The driving method of the original reading apparatus according to claim 8, further comprising a step of adjusting output balance of the color image sensor unit, by changing the lighting periods of respective light emitting elements by the light source driving circuit section, in accordance with the resolution of the original reading apparatus and/or the scanning speed of the original.

12. A driving method of an original reading apparatus comprising a color image sensor unit having an original scanning section which scans an original; a light source section including light emitting elements of at least three different colors, for irradiating the original; a sensor array section including at least three pixel arrays, each of which has a color filter of a different color, and which are arranged in the direction substantially perpendicular to a feeding direction of the original; and a light source driving circuit section which independently turns on and off the light emitting elements; and an image forming section which forms an output image on the basis of image signals from the color image sensor unit,
wherein in a lighting period of the respective light emitting elements, TW, is divided into plural block periods, wherein the TW is a time period of reading per one scanning line by the original reading section, and the emitted light quantity is changed by changing a lighting duty within each of the block periods.

* * * * *